(12) United States Patent
Tunney

(10) Patent No.: US 7,587,946 B2
(45) Date of Patent: Sep. 15, 2009

(54) METHOD AND APPARATUS FOR TESTING ROOF EDGE COMPONENTS

(76) Inventor: Timothy T. Tunney, 312 Penwood Trail, Dacula, GA (US) 30019

( * ) Notice: Subject to any disclaimer, the term of this patent is extended or adjusted under 35 U.S.C. 154(b) by 139 days.

(21) Appl. No.: 11/836,520

(22) Filed: Aug. 9, 2007

(65) Prior Publication Data

US 2008/0053239 A1 Mar. 6, 2008

Related U.S. Application Data

(60) Provisional application No. 60/841,377, filed on Aug. 31, 2006.

(51) Int. Cl.
*G01N 3/02* (2006.01)
(52) U.S. Cl. ......................................................... 73/857
(58) Field of Classification Search .............. 73/379.03, 73/785, 812, 849, 852; 348/80; 355/53; 702/113
See application file for complete search history.

(56) References Cited

U.S. PATENT DOCUMENTS

| | | | |
|---|---|---|---|
| 3,942,362 A | 3/1976 | Keller | |
| 3,945,249 A | 3/1976 | Knoth | |
| 4,015,376 A | 4/1977 | Gerhardt | |
| 4,705,316 A | 11/1987 | Jardin et al. | |
| 4,965,740 A | 10/1990 | Schofield et al. | |
| 5,067,353 A | 11/1991 | Sersen | |
| 5,412,995 A | 5/1995 | Smith et al. | |
| 5,699,274 A * | 12/1997 | Starostovic, Jr. | 702/113 |
| 5,723,785 A * | 3/1998 | Manning | 73/379.03 |
| 5,746,839 A | 5/1998 | Dinwoodie | |
| 5,932,811 A | 8/1999 | Giebner | |
| 6,493,062 B2 * | 12/2002 | Tokuda et al. | 355/53 |
| 6,731,327 B1 * | 5/2004 | Kujawa et al. | 348/80 |
| RE38,988 E | 2/2006 | Dinwoodie | |
| 2003/0100233 A1 | 5/2003 | Fynan et al. | |
| 2004/0014385 A1 | 1/2004 | Greaves, Jr. et al. | |
| 2006/0185267 A1 | 8/2006 | Tonyan et al. | |

FOREIGN PATENT DOCUMENTS

| | | |
|---|---|---|
| EM | 219009 A | 7/1982 |
| EM | 244034 A | 8/1984 |
| JP | 5045257 | 2/1993 |

(Continued)

OTHER PUBLICATIONS

SPRI; Press Releases, International Code Council (ICC) Adopts ANSI Roof Edge . . . ;webpage; Believed to have been published before Aug. 9, 2007; 2 pages; www.spri.org; Waltham, MA.

(Continued)

*Primary Examiner*—Jewel Thompson
(74) *Attorney, Agent, or Firm*—Gardner Groff Greenwald & Villanueva, PC

(57) ABSTRACT

A testing apparatus and method for simulating wind loads and evaluating wind resistance of a building component test specimen such as a sheet-metal roofing component. One or more arrays of pneumatic cylinders apply forces according to a specified test protocol to detach the building component from a test base. A software implemented computer control system may be provided to control the cylinders and apply the forces according to the test protocol.

22 Claims, 19 Drawing Sheets

FOREIGN PATENT DOCUMENTS

SU          577421 A     11/1977

OTHER PUBLICATIONS

SPRI; Design Standard for Gutter Systems Used with Low-Slope Roofs; Jul. 16, 2007; 23 pages.

SPRI; American National Standard Wind Design Standard for Edge Systems Used with Low Slope Roofing Systems; date unknown; 25 pages; Needham, MA.

SPRI; Revised Wind Design Standard for Edge Systems Used with Low Slope Roofing Systems; date unknown; 43 pages.

* cited by examiner

METHOD AND APPARATUS FOR TESTING ROOF EDGE COMPONENTS

CROSS-REFERENCE TO RELATED APPLICATION

This application claims the benefit of U.S. Provisional Patent Application Ser. No. 60/841,377, filed on Aug. 31, 2006, which is hereby incorporated herein by reference in its entirety for all purposes.

TECHNICAL FIELD

The present invention relates generally to the field of testing of building components, and more particularly to an apparatus and method for testing wind resistance of roof edge systems used with low slope and steep slope roofing systems.

BACKGROUND OF THE INVENTION

Roofing edge components such as fascia, coping, gutters and gravel stops are commonly used in connection with various forms of roofing systems including low slope membrane roofing systems. These edge components are typically fabricated from sheet metal, and are affixed to a building structure using one or more nailers, cleats, anchor members, clips, brackets, or other fasteners.

It has been found that roofing components at or near the edge regions of a roofing system can be particularly susceptible to wind damage. For example, and without being bound by theory, when subjected to wind loads, the shape profiles of roofing edge components such as fascia, coping, and gravel stops, as well as their proximity to the edge of a structure and/or their exposure to direct wind pressure, are believed to contribute to both lateral forces and upward Bernoulli lift on the roofing components. These forces can sometimes result in detachment of the roofing edge components from the structure, potentially causing damage to the structure and/or more remote property damage or personal injury from impact by the detached edge components.

Because of this problem, standards have been promulgated for measuring the ability of roofing edge components to withstand damage or detachment by wind and for specifying minimum wind resistance characteristics. For example, the American National Standards Institute (ANSI) and the Single-Ply Roofing Industry (SPRI) have developed the ANSI/SPRI ES-1 and BSR/SPRI/FM4435 ES-1 Guidelines and Wind Design Standard for Edge Systems Used with Low Slope Roofing Systems, and SPRI GD-1 which are hereby incorporated herein by reference. These standards and guidelines specify certain test criteria, but do not specify particular test equipment to be utilized in determining compliance. These standards have been adopted into the building codes of many jurisdictions and, as a result, it has become increasingly important for manufacturers of building components to have access to test equipment and methods of testing to ensure compliance of their products.

Accordingly, it can be seen that a need exists for apparatus and methods for testing wind resistance of building components and testing for compliance with various standards and building codes. It is to the provision of testing apparatus and methods meeting these and other needs that the present invention is primarily directed.

SUMMARY OF THE INVENTION

In example forms, the present invention is an apparatus for testing building components such as sheet metal roofing components including fascia, coping, gravel stops, and gutters for resistance to wind damage and detachment from a supporting structure. Embodiments of the apparatus of the present invention enable testing methods for determining compliance with building codes and standards, including the ANSI/SPRI ES-1 and BSR/SPRI/FM4435 ES-1 Guidelines, SPRI GD-1 and Wind Design Standard for Edge Systems Used with Low Slope Roofing Systems.

In one aspect, the present invention is a testing apparatus for determining wind resistance of a building component. The testing apparatus preferably includes a structural frame, a test base attached to the structural frame and arranged for mounting the building component onto it, at least one pull bar mounted between the test base and the building component, and an array of pneumatic cylinders for coupling to the at least one pull bar to apply force thereon.

In another aspect, the invention is a method of testing wind resistance of a building component using an apparatus as described. In yet another aspect, the invention is a building component tested according to the method described.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION OF EXAMPLE EMBODIMENTS

The present invention may be understood more readily by reference to the following detailed description taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

With reference now to FIGS. 1-17, there is shown a testing apparatus 10 according to a first example embodiment of the present invention. The testing apparatus 10 is used for testing the pull-off resistance of a building component test specimen 12 from a test base 14. In the depicted embodiment, the building component test specimen 12 is a length of sheet metal coping, but the apparatus 10 may be utilized for testing various other forms of building components including fascia, gravel stops, gutters, edge moldings, and the like.

Figure 1:
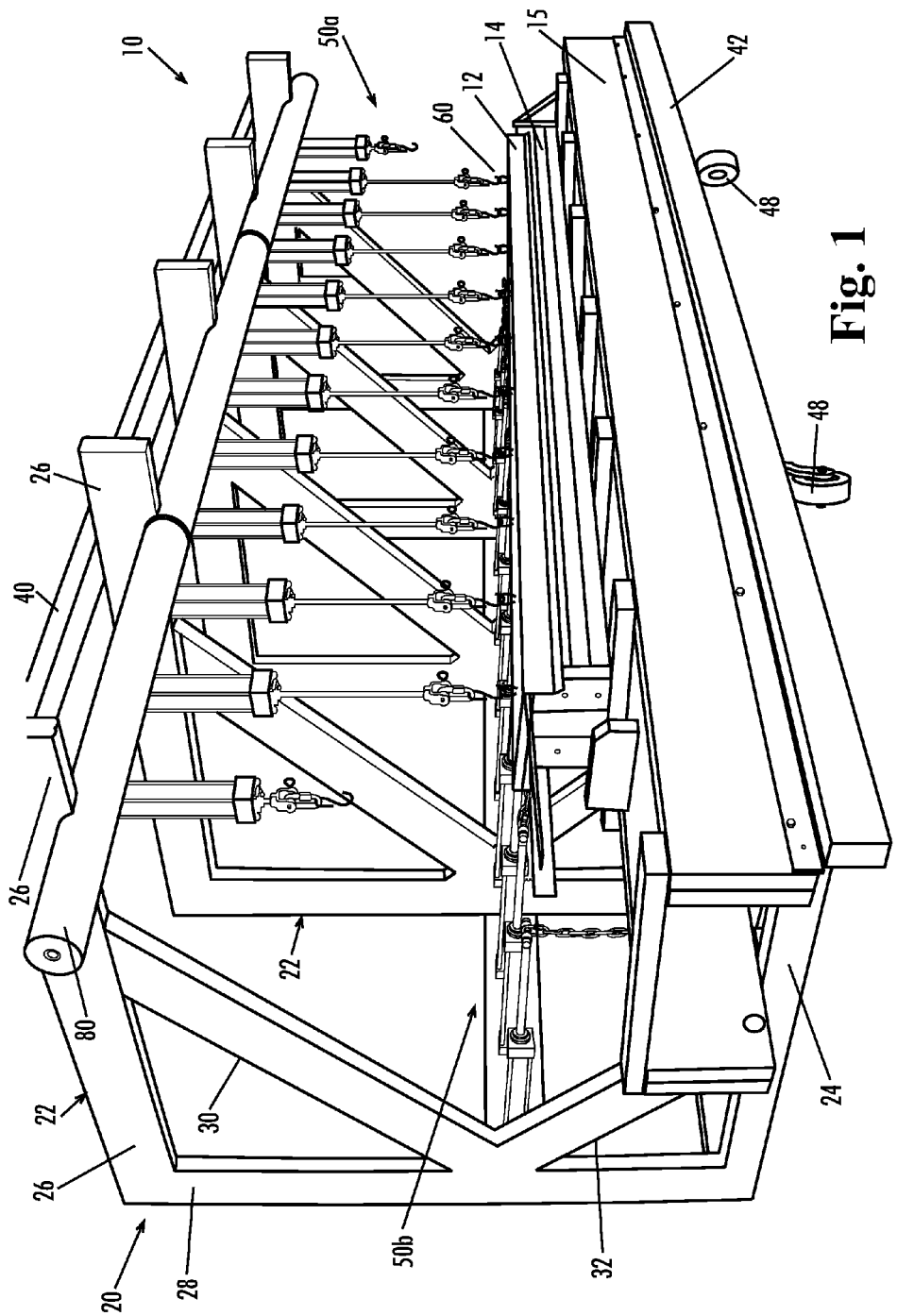
FIG. 1 shows a front perspective view of a testing apparatus according to a first example form of the present invention, with a coping type of edge component as the test specimen.
Figure 5:
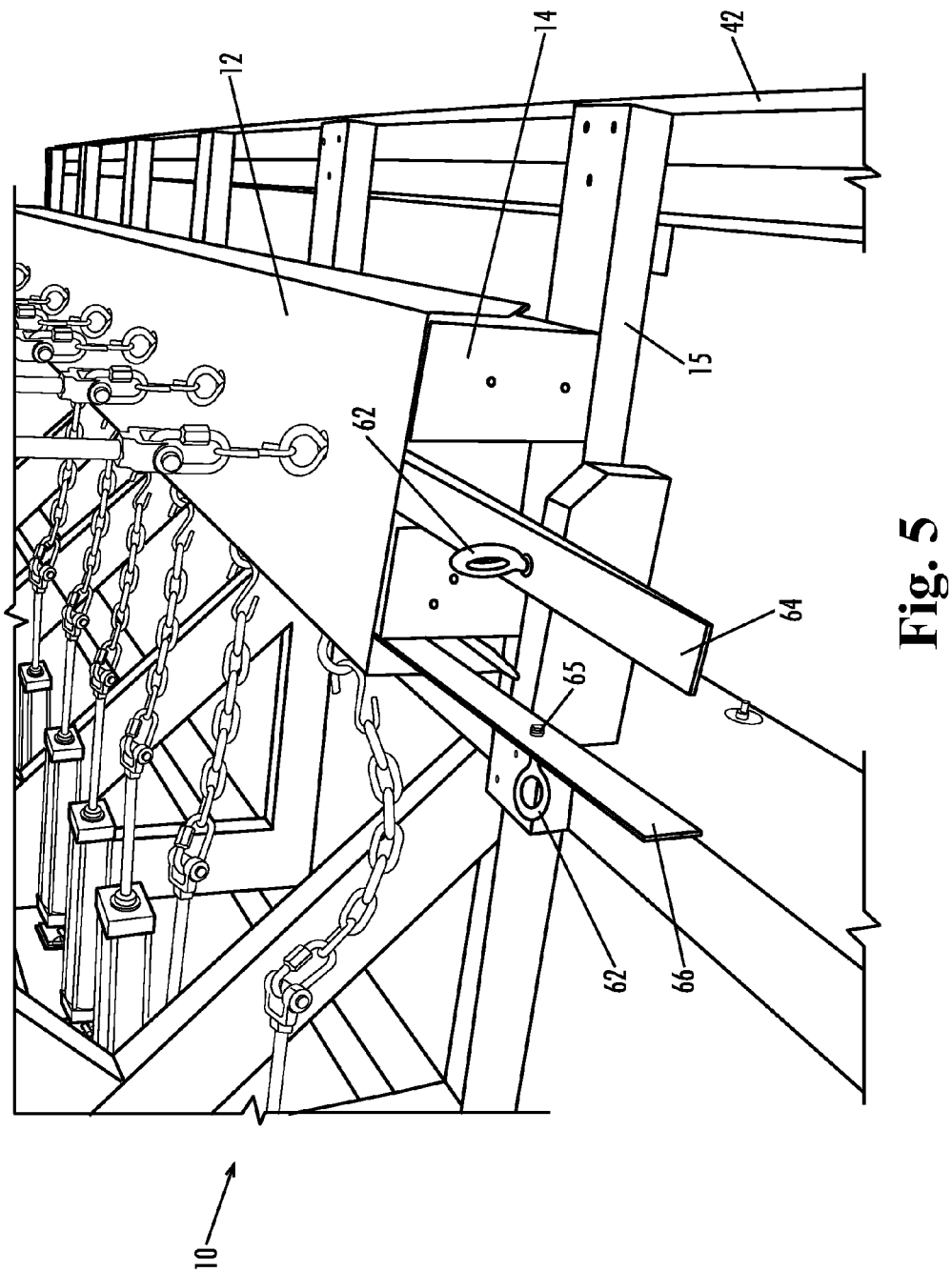
FIG. 5 shows details of the pull bars connecting the test specimen to the testing apparatus shown in FIG. 1.
Figure 6:
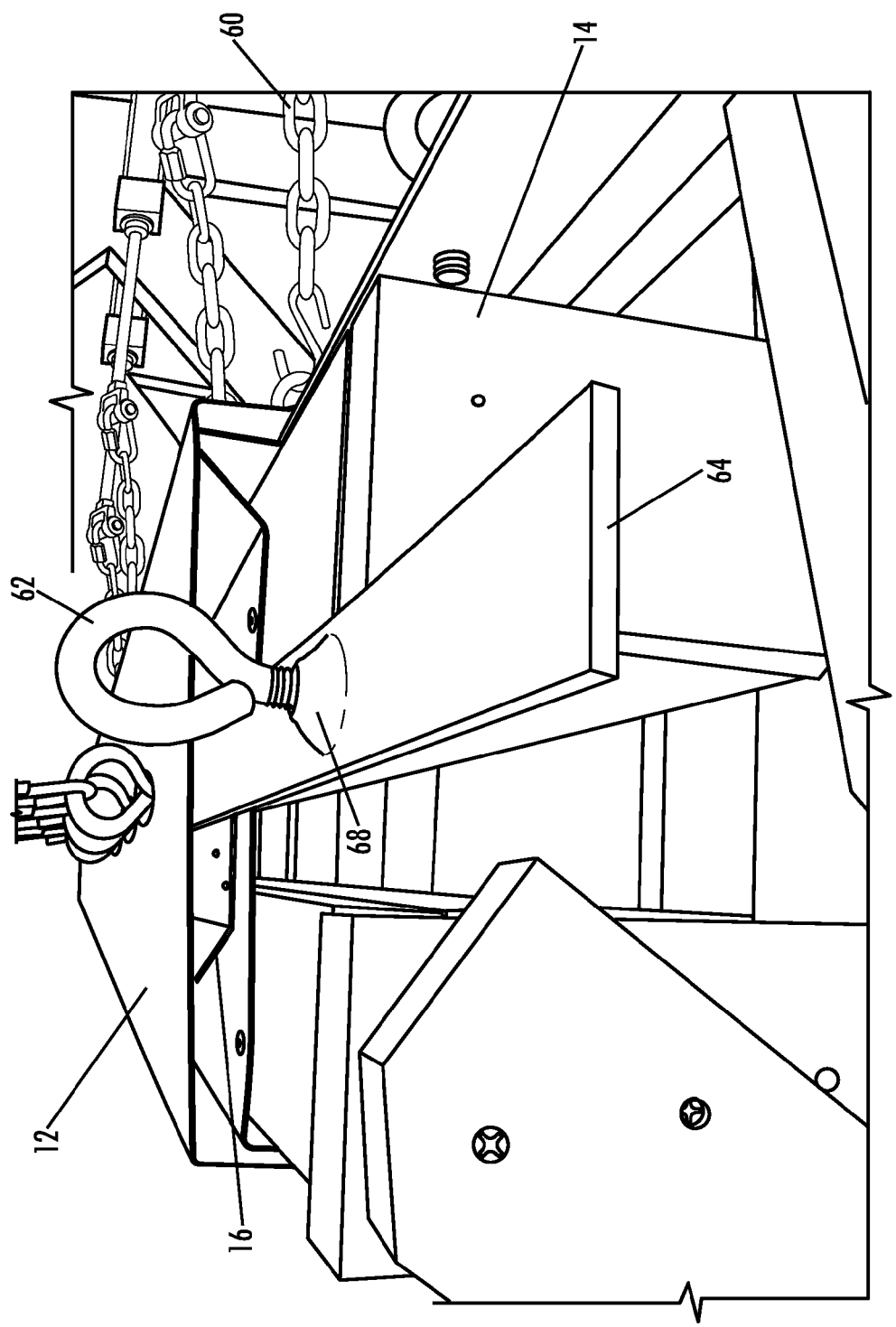
FIG. 6 shows details of the attachment of the test specimen to a test base of the apparatus shown in FIG. 1.

With reference to FIGS. 1, 5, and 6, the test base 14 may be constructed of lumber framing or another material representative of an actual building structure to which the building component test specimen 12 would be mounted in typical usage. The test base 14 may be configured for use with the particular geometry of particular building component test specimens, and preferably is easily interchangeable for use with other types and sizes of building component test specimens. In the depicted embodiment, the test base 14 is constructed of two stacks of 2"×4" pieces of wood, with the wood in each stack nailed or otherwise secured together, stacks spaced apart with a front-to-back width selected for the size of the particular test specimen, the stacks mounted to a pedestal 15, and the pedestal bolted or otherwise mounted to the frame 20 of the testing apparatus 10. The test base 14 can be mounted to the pedestal 15 by fasteners such as nails, screws, straps made of metal of another material, vacuum/suction devices, other types of fasteners, or a combination thereof. In addition, blocks of wood may be mounted to the ends of the test base and to the pedestal for additional securement (see FIGS. 1 and 7). The pedestal 15 is preferably made of wood, which provides for ease of detaching the test base 14 and reattaching it (or interchanging a new test base) with the stacks spaced apart at a different front-to-back width for testing a different-sized test specimen. In the depicted embodiment, the pedestal 15 is made of two spaced apart vertical rails, each one made of two 2"×6" pieces of wood secured together, with a series of 2"×4" pieces of wood spanning the rails. In alternative embodiments, the pedestal 15 is a solid body made of metal, wood, or another material, whether constructed as an integral part of the frame 20 or as a removable and replaceable part. The pedestal 15 has a front-to-back width that is large enough for mounting the test base 14 to it in a configuration for testing the largest size of test specimen 12 typically tested. In the depicted embodiment, the test apparatus 10 is used with the test base set up to simulate as large as 12½" thick (front-to-back) walls, and the pedestal 15 has a front-to-back width of 24" to accommodate this. In an alternative embodiment the pedestal 15 has a larger front-to-back width for testing larger-width test specimens and in other alternative embodiment the pedestal has a smaller front-to-back depth for testing only smaller-width test specimens.

Figure 9:
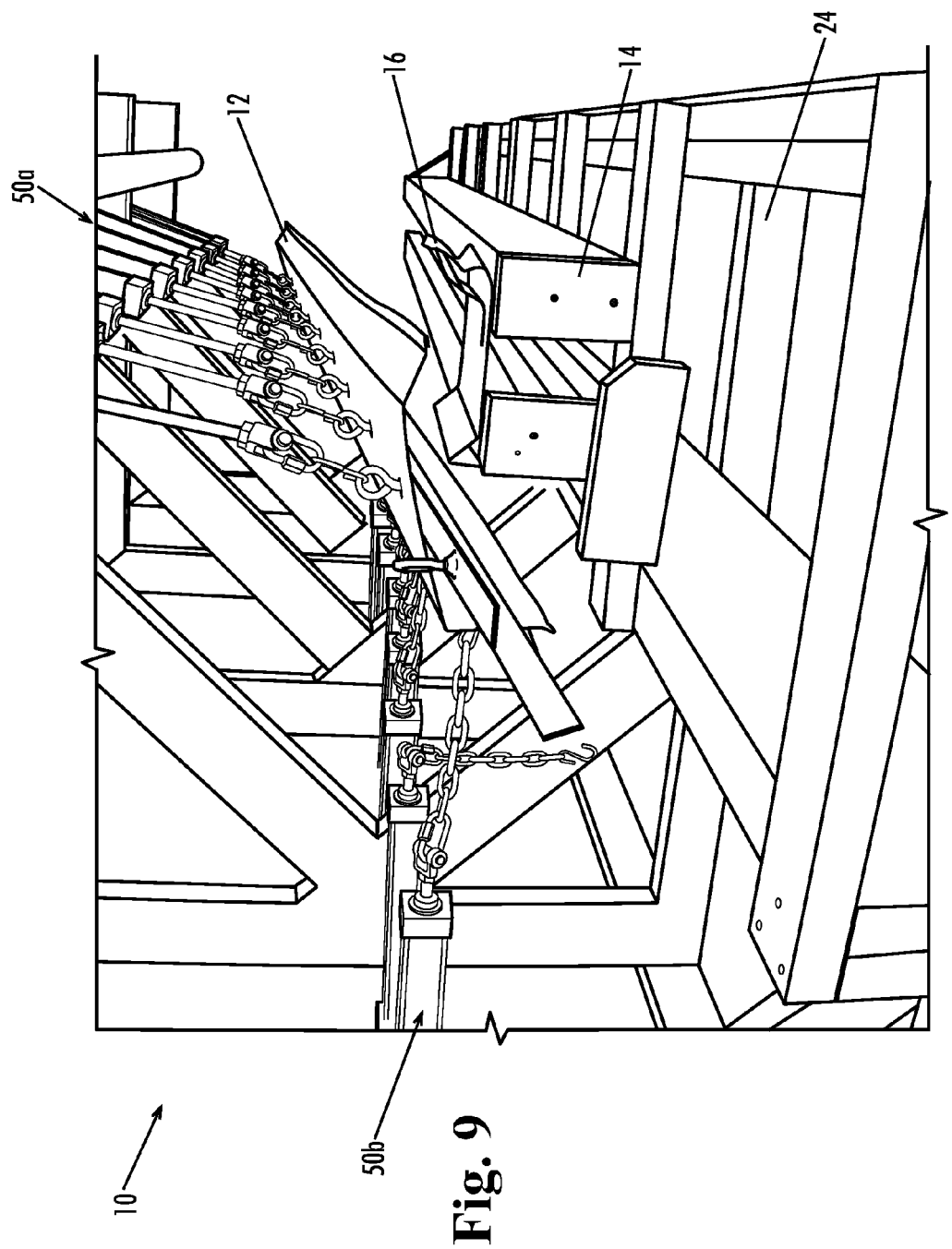
FIG. 9 shows the test specimen detached from the test base after being tested to failure by the testing apparatus of FIG. 1.
Figure 10:
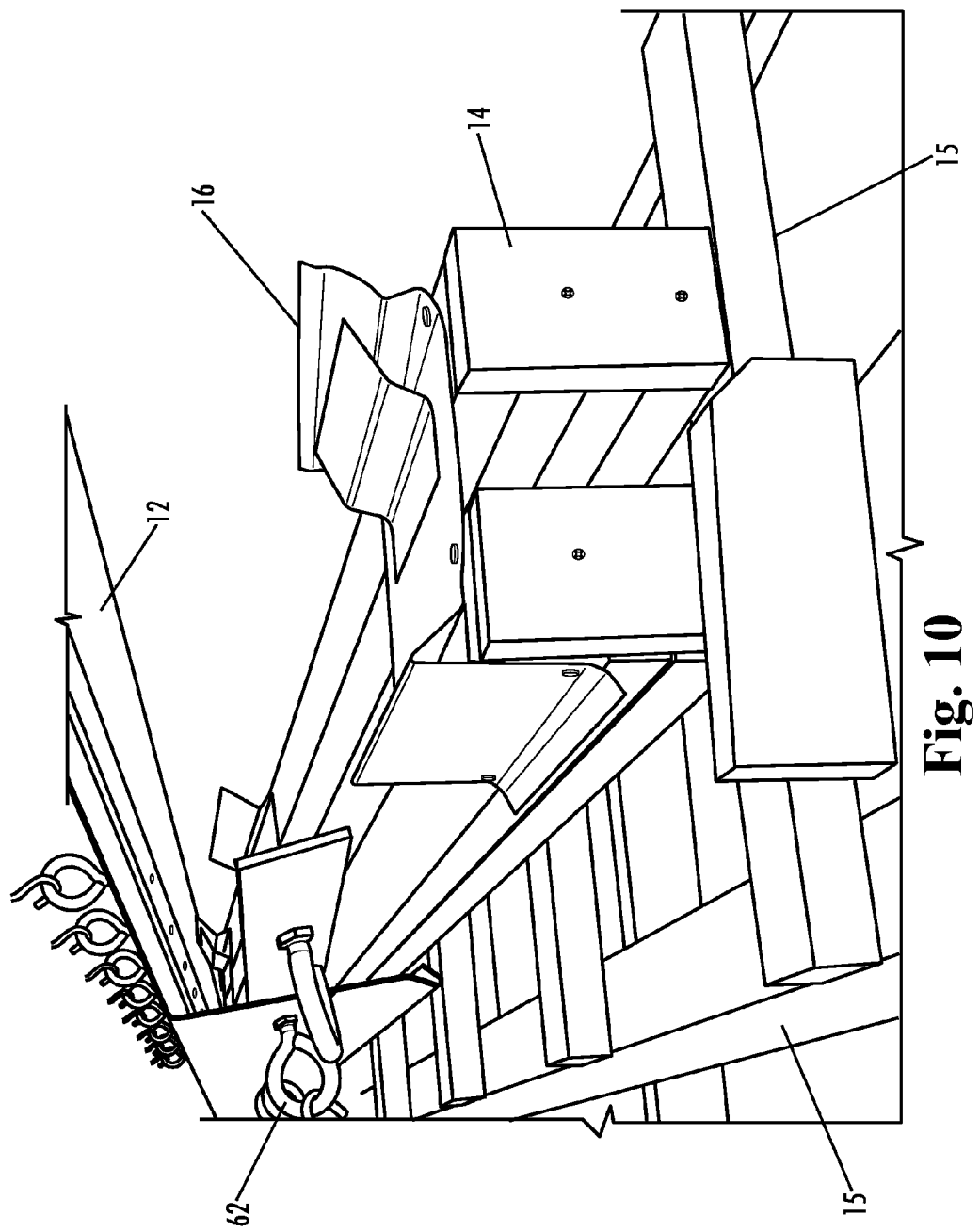
FIG. 10 shows further detail of the detached test specimen and the test base after being tested to failure by the testing apparatus of FIG. 1.
Figure 11:
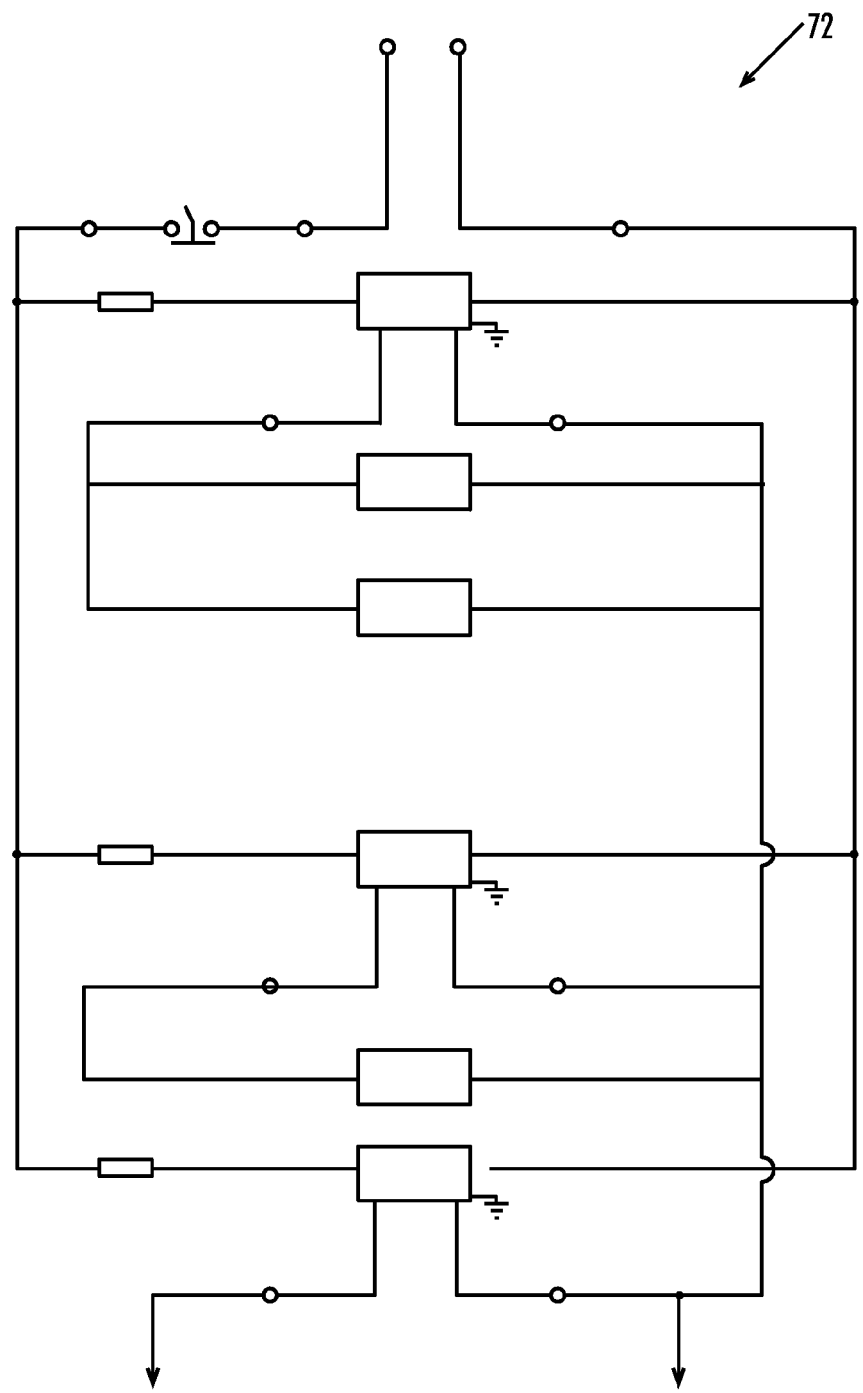
FIG. 11 shows a first portion of a wiring diagram of the control system of the testing apparatus of FIG. 1.
Figure 12:
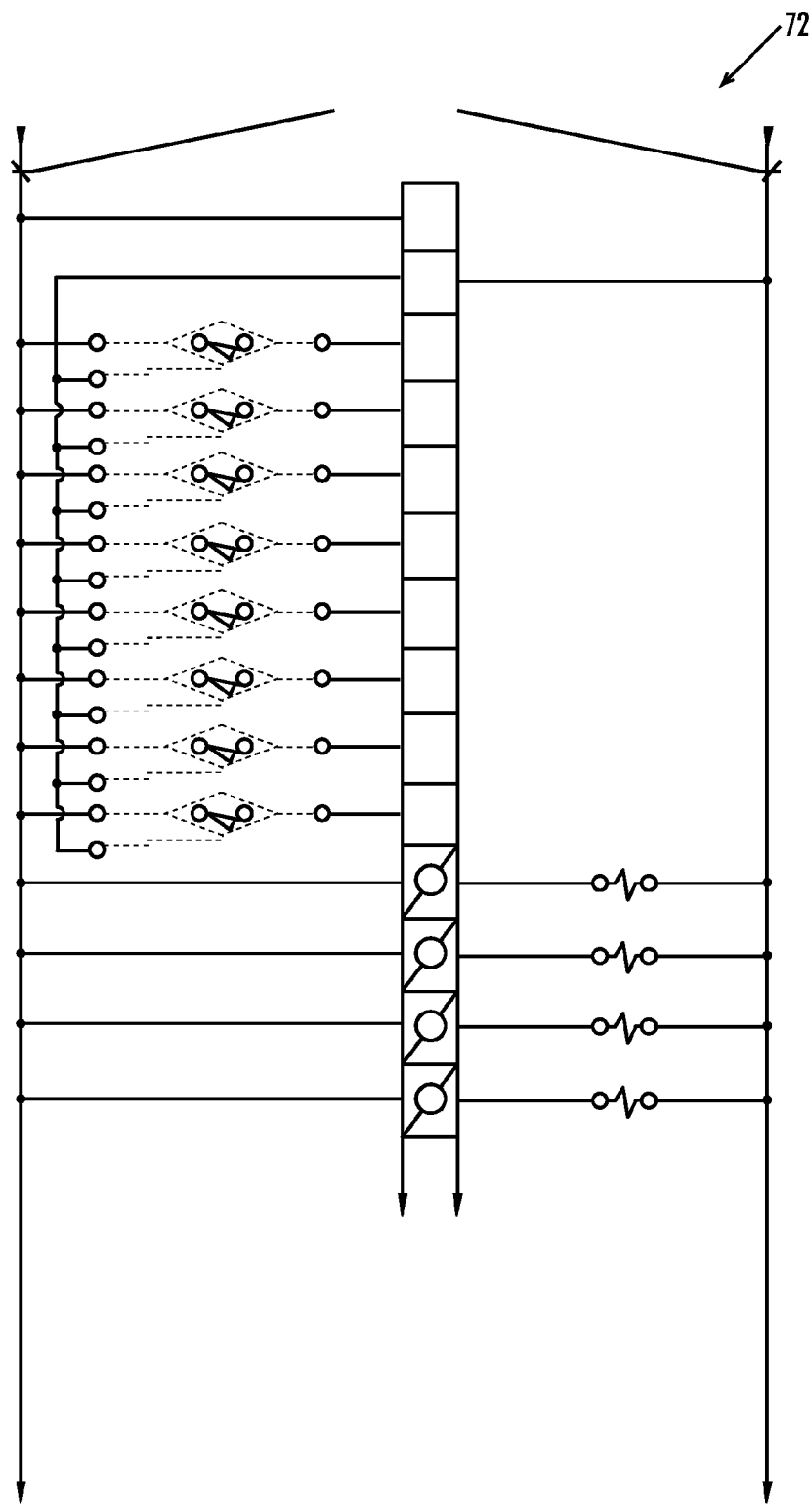
FIG. 12 shows a second portion of the wiring diagram of the control system of the testing apparatus of FIG. 1.
Figure 13:
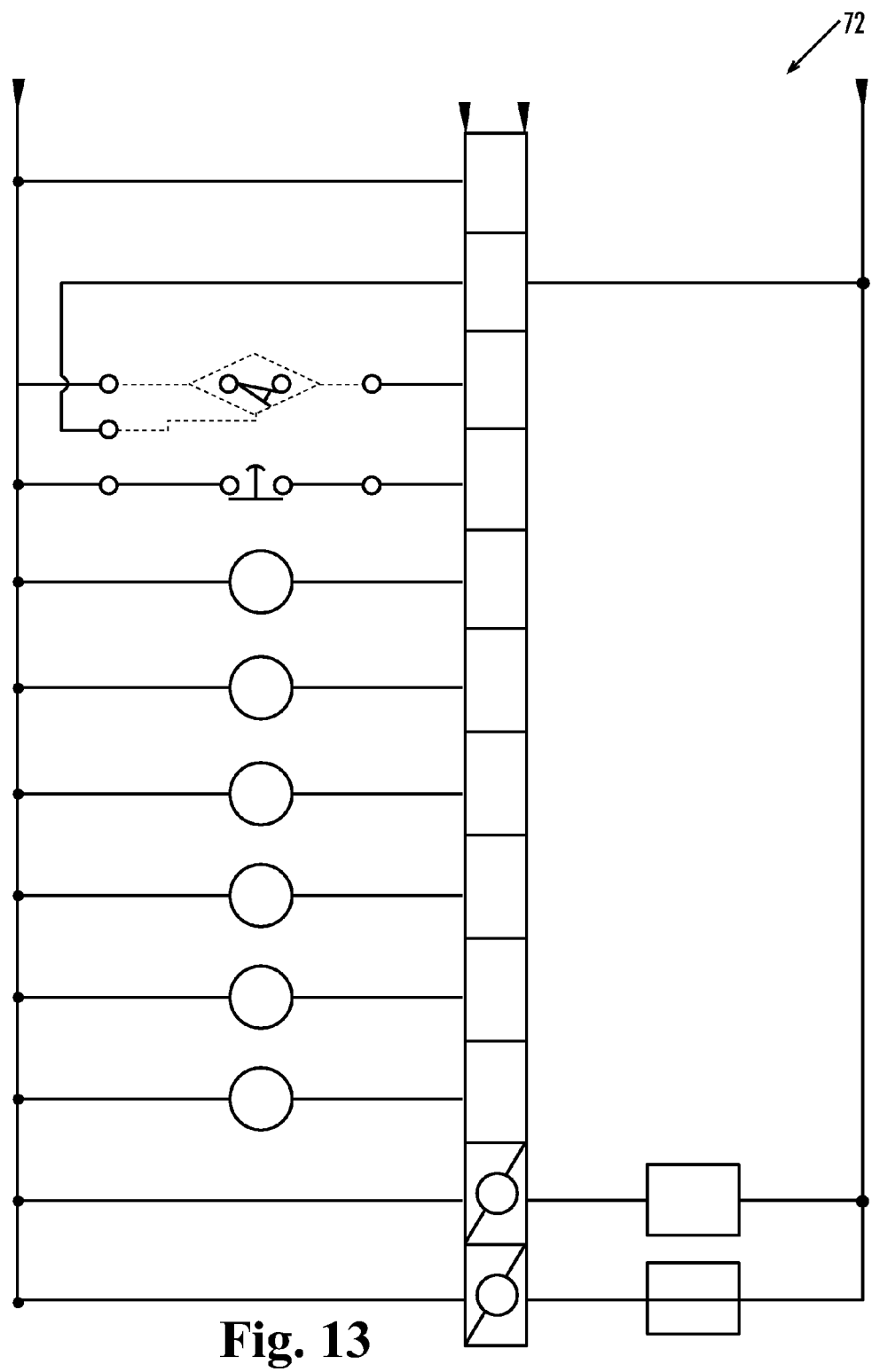
FIG. 13 shows a third and final portion of the wiring diagram of the control system of the testing apparatus of FIG. 1.
Figure 14:
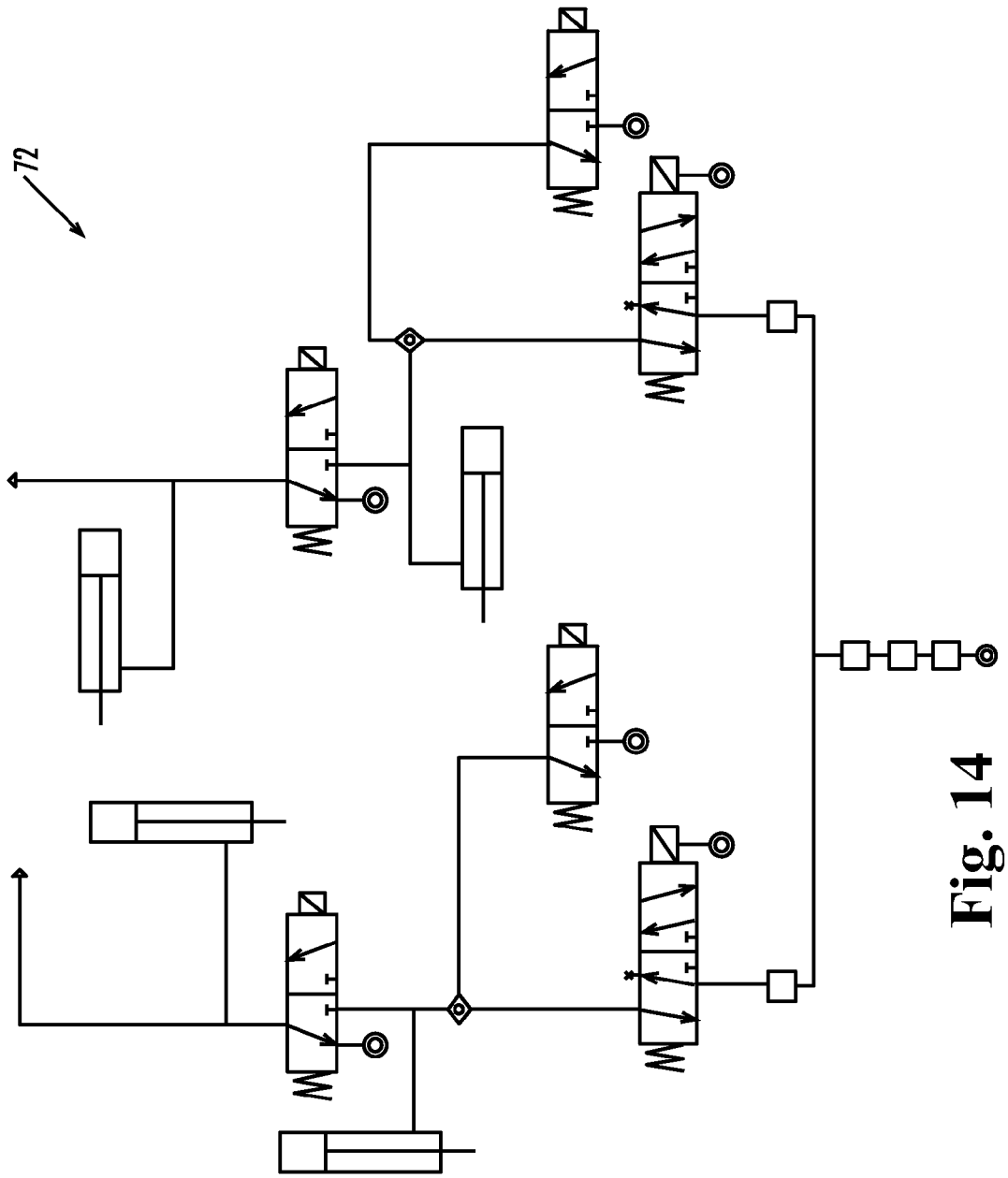
FIG. 14 shows a pneumatic schematic of the control system of the testing apparatus of FIG. 1.
Figure 15:
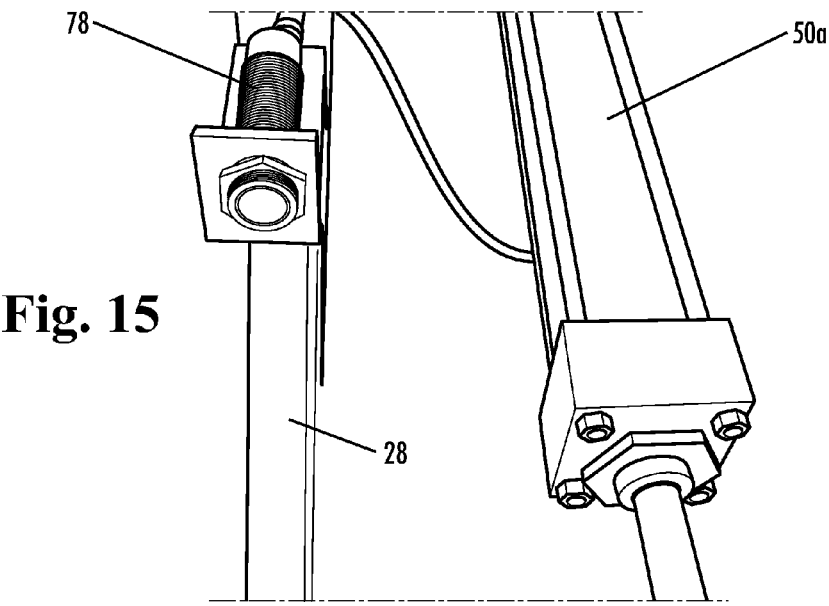
FIG. 15 shows a failure-detecting sensor of the control system of the testing apparatus of FIG. 1.
Figure 16:
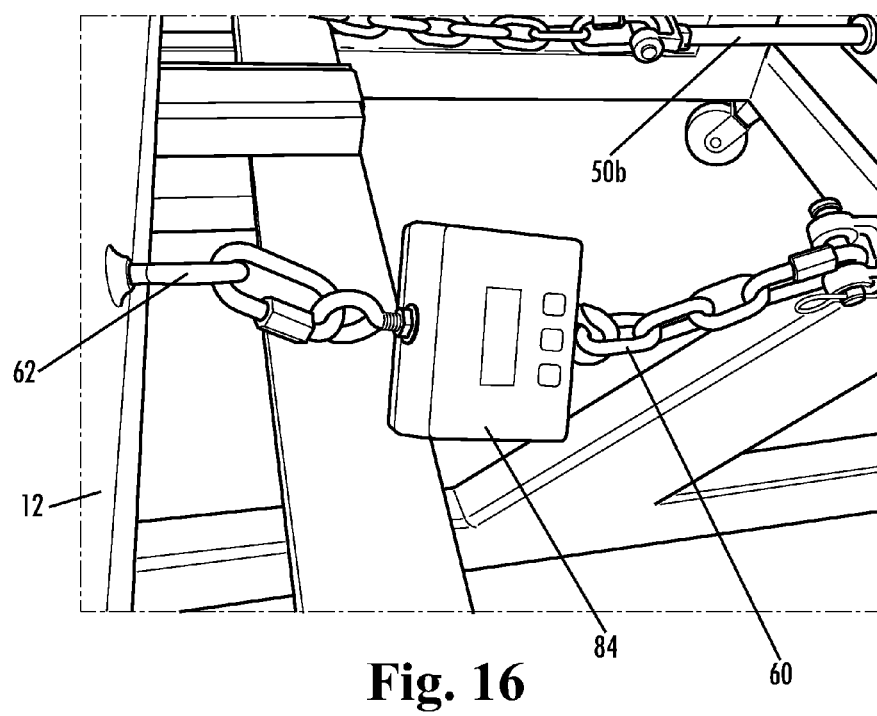
FIG. 16 shows a load-testing/calibration device of the testing apparatus of FIG. 1.

With reference to FIGS. 6, 9, and 10, the building component test specimen 12 may be mounted to one or more intermediate members such as anchor cleats 16 (as are used in typical usage of the building component test specimen), with the intermediate members in turn being mounted to the test base 14 by fasteners. This is preferably done using anchor cleats 16 or other intermediate members of a type typically used in mounting the test specimen 12 to the building structure in actual usage. Alternatively, the building component test specimen 12 may be mounted to the test base 14 by other fasteners or attachments.

With reference to FIG. 1, the apparatus 10 comprises a substantially rigid structural frame 20 with the test base 14 and a force application system mounted thereto. The structural frame 20 of the depicted embodiment is constructed of 2"×6" rectangular structural steel tubing welded together, though the frame may be constructed of other material(s) having sufficient strength and rigidity for the intended forces to be applied, as by welding, couplings, bolts, or other conventional assembly methods. The structural frame 20 of the depicted embodiment includes a plurality of vertical support braces 22, each having a generally horizontal base member 24, a generally horizontal upper member 26, a generally vertical intermediate member 28 extending between the horizontal base and upper members, and a pair of obliquely angled brace members 30 and 32 configured in a K-shaped profile. In addition, it includes a top beam 40 extending across the front ends of the upper members 26 of the vertical support braces 22, one or more bottom beam(s) 42 extending across the front ends of the base members 24 of the vertical support braces, and upper and lower back beams 44 and 46 extending across the back sides of the intermediate members 28 of the vertical support braces. The top beam 40, bottom beam 42, and upper and lower back beams 44 and 46 preferably extend along substantially the entire length of the testing apparatus 10, tying the vertical support braces 22 together into a unitary structural framework. Preferably, the overall length of the frame 20 is at least about 8' to 10', and more preferably at least about 12' to 14', so that 8', 10', and/or 12' lengths of the building component test specimens 12 can be evaluated. Locking wheels 48 are preferably mounted to the bottom of the frame 20 to permit the apparatus 10 to be easily moved and fixed in position.

Figure 2:
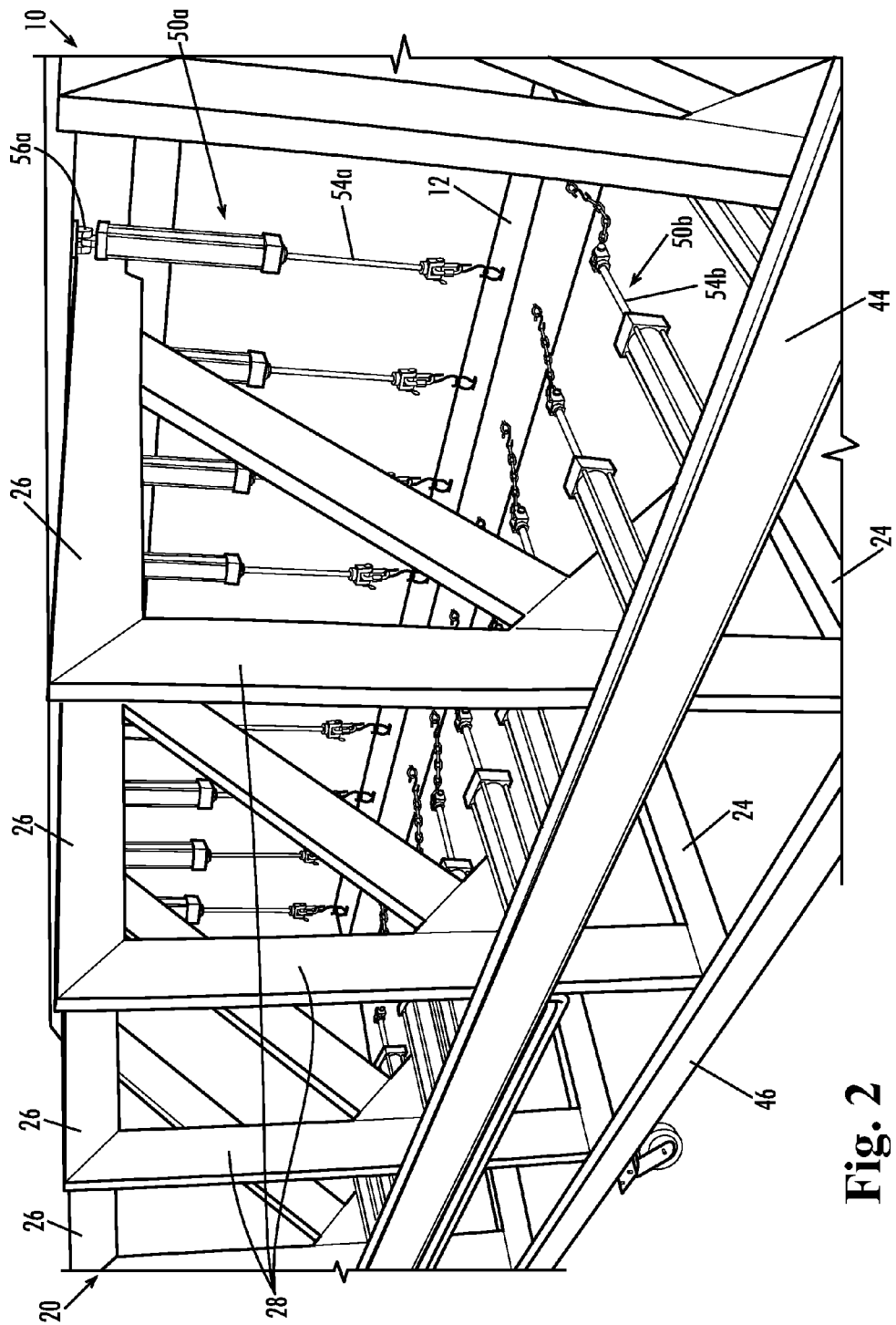
FIG. 2 shows a portion of the testing apparatus of FIG. 1, viewed from a rear perspective.
Figure 3:
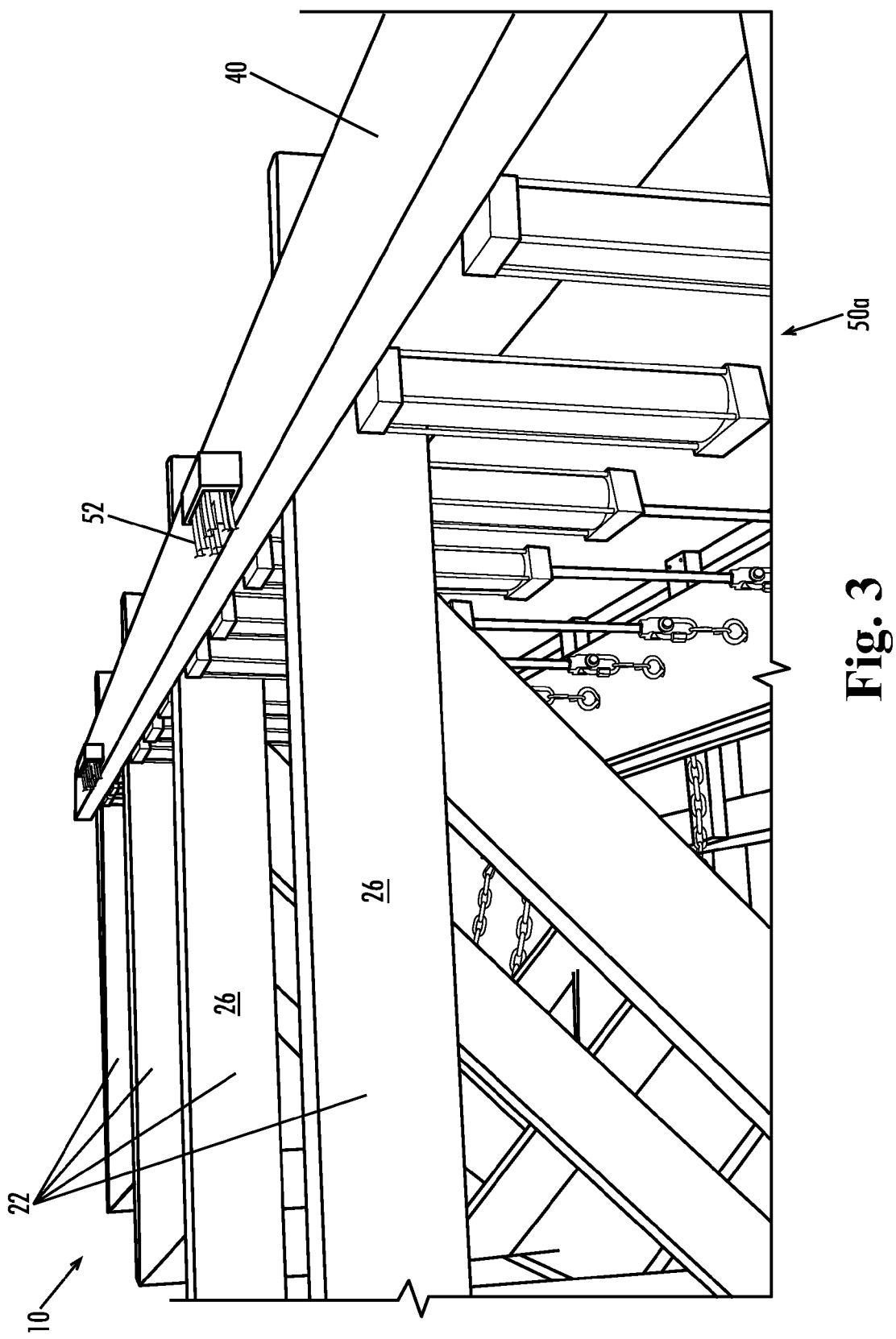
FIG. 3 shows pneumatic distribution components of the testing apparatus shown in FIG. 1.

With reference to FIGS. 1 and 2, the force application system preferably comprises a plurality of actuators for applying force to the test specimen 12 in one or more directions. For example, in the depicted embodiment, a first linear array of pneumatic drive cylinders 50a are mounted to hang vertically from the top beam 40 for applying a lifting force to the test specimen 12, and a second linear array of pneumatic drive cylinders 50b are mounted to extend horizontally from the upper back beam 44 for applying a lateral force to the test specimen. (The cylinders 50a and 50b are collectively referred to herein as "the cylinders 50.") In example embodiments, some or all of the cylinders may include cushions, pickups and/or sensors, and may for example be TRD Cylinders part nos. TD-MP4-2-X-12, TD-MP4-2-X-12-MPR, TD-MP1-2-X-12, and/or TD-MP1-2-X-12-MPR cylinders. Pressurized air is preferably delivered from one or more compressors (unshown), for example at about 150 psi, via pneumatic hose and/or tubing 52 to actuate the cylinders 50. (For ease of illustration, the ends of the pneumatic lines 52 are shown in the figures, but not the entire lengths.) A pneumatic proportional pressure controller and slow-start pneumatic device, such as a MacValve slow-start, are preferably included, as well as one or more pressure regulators and mufflers for noise control upon discharge. The vertical and horizontal arrays of cylinders 50a and 50b preferably are selectively controllable to permit application of vertical force only, horizontal force only, or a combination of vertical and horizontal force; and optionally any one of the horizontal cylinders and any one of the vertical cylinders can be selectively operable for calibration purposes. The cylinders 50 of each of the vertical and horizontal arrays 50a, 50b are preferably spaced evenly at about 12" or less apart from one another. In alternate embodiments, other forms of force actuators such as hydraulic cylinders, motors, jacks, winches, electromagnets, threaded members, pulley systems with mechanical weights adjustably connected thereto, or the like are used in place of pneumatic cylinders. In other alternative embodiments, one array of actuators is angularly adjustable and connected to the test specimen to provide both the lifting and lateral forces.

Figure 4:
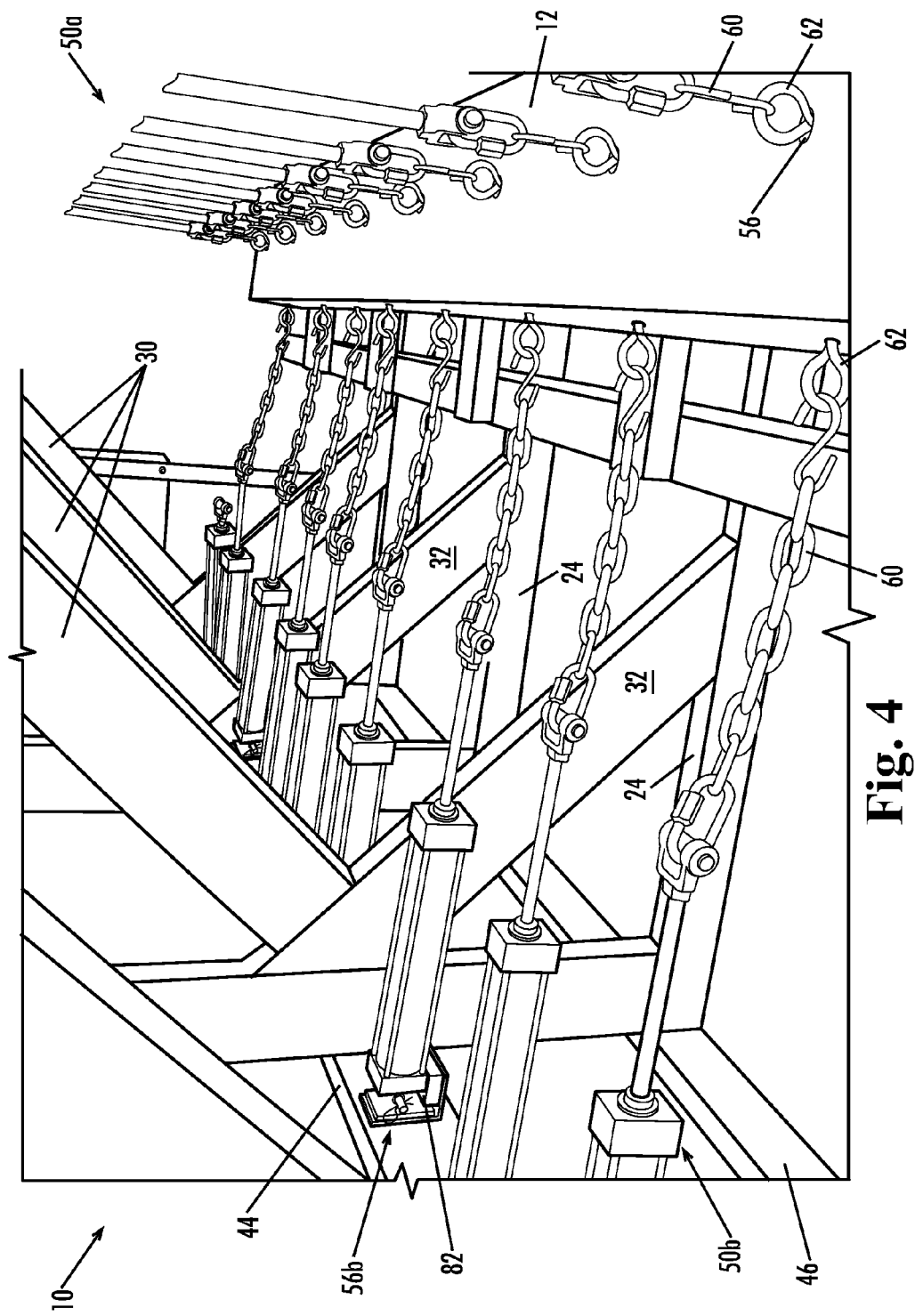
FIG. 4 shows a detailed view of the connection of the testing apparatus of FIG. 1 to a test specimen.

Referring additionally to FIGS. 4-6, the vertical and horizontal arrays of cylinders 50a and 50b are coupled to the building component test specimen 12 for applying the test forces. In the depicted embodiment, for example, the vertical and horizontal arrays of cylinders 50a and 50b are preferably connected via linkages 60 such as chains, S-hooks, split-links, or other couplings to first and second linear arrays of eye-bolts 62 (or other first coupling parts), which are in turn attached to vertical and horizontal pull bars 64 and 66 respectively. The eye-bolts 62 are preferably spaced at intervals approximately equal to the spacing of the cylinders 50, most preferably at evenly spaced intervals of about 12" or less. The eye-bolts 62 are received by mating nuts 68 (or other second mating coupling parts) that are welded or otherwise attached to the pull bars 64 and 66. Preferably, holes 65 are drilled or otherwise formed in the pull bars 64 and 66 where the nuts 68 are to be mounted so that the eye-bolts 62 may screwed in all the way through the nuts and into or through the holes. To test the building component test specimen 12, holes 58 are formed in it by for example drilling, with the holes spaced and sized to receive the nuts 68 and eye-bolts 62 through them. In an alternative embodiment, a single cylinder or other actuator is connected to the test specimen by a "tree" linkage with a trunk end connected to the cylinder and with branches that fork off for connecting to the test specimen at the desired locations. It will be understood that, instead of using eye-bolts and nuts, other conventional couplings (e.g., bolts and nuts, chain or cable fittings, or threaded C-shaped connectors) may be used to extend through the holes and connect the linkages to the pull bars. Preferably, the eye-bolt/nut couplings or other couplings are sized and shaped so that at least a first part of the couplings (e.g., the "eyes" of the eye-bolts) does not fit through the holes 58 and a second part of the couplings (e.g., the "stems" of the eye-bolts) does fit through the holes, so that the couplings may be attached to the pull bars 64 and 66 through the holes but the test specimen cannot pulled over the couplings and removed from them.

As seen best with reference to FIGS. 5, 6, 9, and 10, the pull bars 64 and 66 are mounted between the test base 14 and the building component test specimen 12, with the eye-bolts 62 and the nuts 68 projecting through the holes 58 in the test specimen. The holes 58 in the test specimen 12 are sized and shaped to receive the nuts 68 through them so that the nuts do not abut and transfer the forces to the test specimen, which could cause the test specimen to fail at those places. Instead, with the nuts 68 extending through the holes 58 in the test specimen 12, the pull bars 64 and 66 abut and transfer the forces to the test specimen, but because the pull bars run along all or substantially all of the length of the test specimen, the forces are spread out along all or substantially all of the length of the test specimen. The pull bars 64 and 66 are preferably fabricated from continuous lengths of steel bar stock or other structural material. In the depicted embodiment, for example, the pull bars 64 and 66 are provided by 1½"×⅛" cold rolled steel flats, or ½"×1"×½"×⅛" thick steel channel. In an alternative embodiment, instead of using the nuts, threads are tapped into the pull bars for mating with the eye-bolts.

When the linkages 60 are attached to the building component test specimen 12, the actuating rods 54a and 54b (collectively, the "rods 54") of the cylinders 50 are generally not perfectly aligned with the eye-bolts 62. So when the cylinders 50 are actuated to apply the pulling forces to the building component test specimen 12, the cylinder rods 54 are subject to bending forces that can bend or break the cylinder rods. In order to minimize the bending forces on the cylinder rods 54, the cylinders 50 are preferably mounted to the frame 20 by joints that permit angular movement of the cylinders (but not linear movement). In addition, when the test specimen 12 fails because of the vertical forces from the vertical-force cylinders 50a, the test specimen tends to pull off the test base 14 axially (vertically toward the vertical-force cylinders) and laterally (side-to-side along the horizontal length of the test specimen). But when the test specimen 12 fails because of the horizontal forces from the horizontal-force cylinders 50b, the test specimen tends to pull off the test base 14 axially (horizontally toward the cylinder) but not laterally (side-to-side along the horizontal length of the test specimen).

Figure 7:
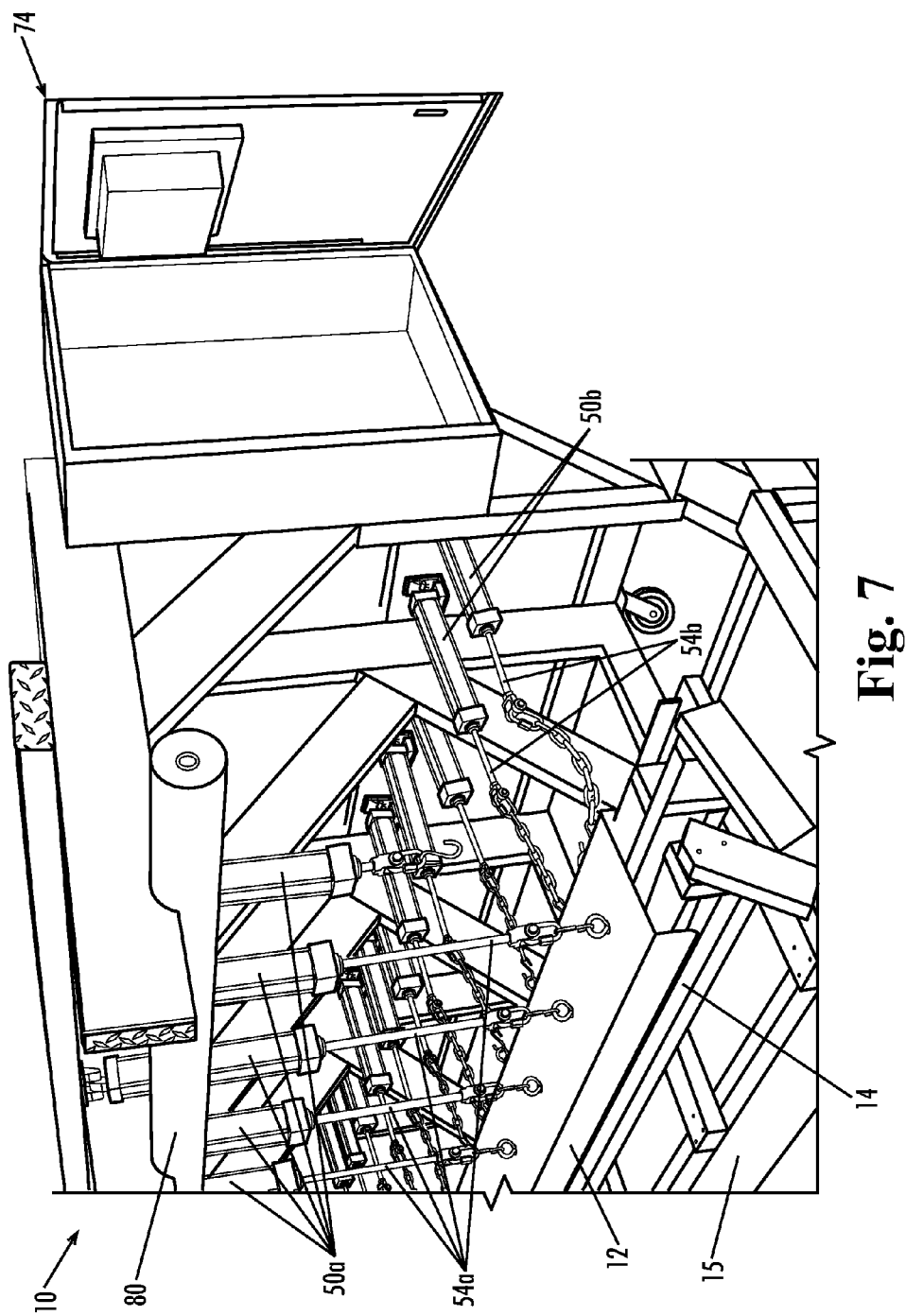
FIG. 7 shows computer control and data collection components of a control system of the testing apparatus of FIG. 1.
Figure 8:
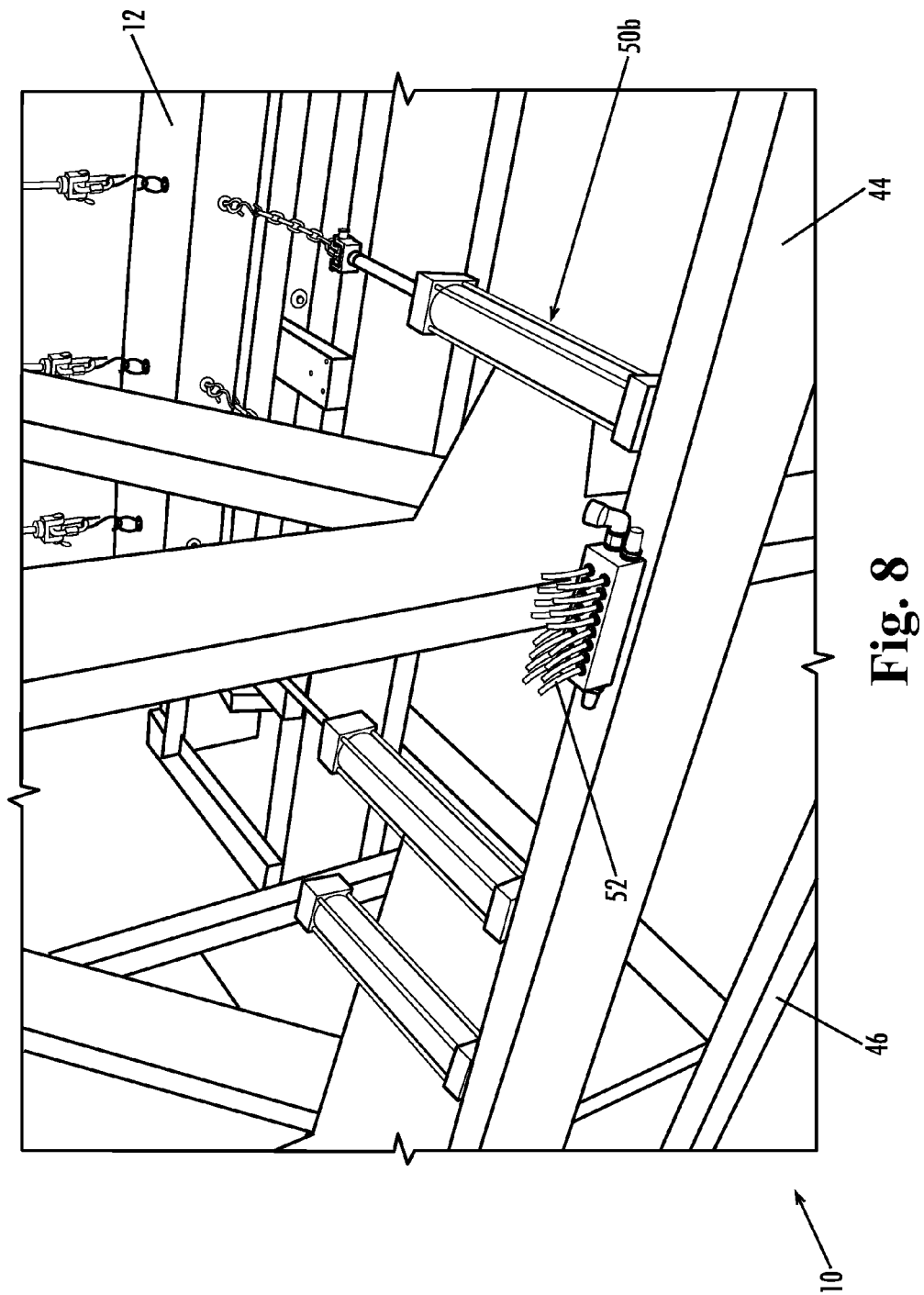
FIG. 8 shows additional pneumatic distribution components of the testing apparatus of FIG. 1.

Because of this, in the depicted embodiment the vertical-force cylinders 50a are mounted to the top beam 40 by ball joints 56a that permit the cylinders to hang freely, swivel in any direction, and align with the eye-bolts 62 (see FIGS. 2 and 7). Thus, the ball joints 56a permit the vertical-force cylinders 50a to self-align with the eye-bolts 62 to minimize the bending forces on the cylinder rods 54. And when the test specimen 12 fails, the vertical-force cylinders 50a are free to swivel in any direction for dissipating instead of absorbing forces from the rapidly moving test specimen. Because the vertical-force cylinders 50a are self-aligning, the linkages 60 connecting them to the test specimen 12 can be short, such as the S-shaped connectors shown in the figures. In alternative embodiments, other swivel joints such as Heim joints may be used, pivot joints such as hinged joints are used in conjunction with longer linkages or other structures to help dissipate the lateral kinetic energy from the failure, and/or other conventional mounting joints are used.

In addition, the horizontal-force cylinders 50b of the depicted embodiment are mounted to the upper back beam 44 by hinged joints 56b that permit the cylinders to pivot about only one axis (the horizontal longitudinal axis) and align vertically with the eye-bolts 62 (see FIGS. 4 and 7). The hinged joints 56b are used on the horizontal-force cylinders 50b to restrict them from lateral movement (side-to-side along the horizontal length of the test specimen), because the test specimens 12 do not tend to fail in this direction. But then the horizontal-force cylinders 50b cannot self-align horizontally with the eye-bolts 62. Therefore, the linkages 60 connecting the horizontal-force cylinders 50b to the test specimen 12 are preferably flexible (e.g., chains with threaded C-shaped connectors) and long enough (e.g., approximately 24" long) to provide a smooth transition for any horizontal mis-alignment, thereby minimizing the bending forces on the cylinder rods 54. Furthermore, the flexible linkages 60 allow for connecting the cylinders 50b to the test specimen 12 without having to make the lengths of the linkages exactly fit the distance between the cylinders and the test specimen. In alternative embodiments, swivel joints such as ball joints or Heim joints are used with or without shorter linkages, other structures are used to help dissipate the kinetic energy from the failure, and/or other conventional mounting joints are used.

FIGS. 7 and 11-14 show details of an electrical schematic and a pneumatic schematic for a control system 72 of the apparatus 10 of the example embodiment. The control system preferably includes an onboard controller 70 and/or an external computer (not shown) to control, monitor, and record the testing sequence. In preferred form, the apparatus includes a control panel 74 incorporating a touch-screen input/output device, an emergency shutoff switch, an on-board computer microprocessor, digital memory, and/or other controls. In an example embodiment, an EATON PANELMATE EPRO PS12.1 touchscreen color display with data archiving (No. 7685T-12) is utilized. Computer readable and actuatable software is preferably loaded into the memory for controlling and operating the device in response to user-input instructions.

To use the apparatus 10, the holes 56 are drilled or otherwise formed in the test specimen 12, the pull bars 64 and 66 are coupled to the linkages 60 with the building component test specimen 12 between them, the test base 14 is positioned (or selected, if different test bases are used for each size and type of test specimen) for the particular test specimen to be tested, the test specimen is mounted to the test base, and the linkages are connected to the cylinders. The user then selects and initiates the desired testing parameters using the touch-screen or other input/output device of the control panel 74. A calibration sequence (for example, using the load-testing device 84) is optionally performed prior to initiating the actual test sequence. The microprocessor signals the proportional pressure controller to direct pressurized air in a controlled fashion to drive the cylinders 50. The slow-start pneumatic controller applies pressure to the cylinders 50 in a controlled manner to minimize jerk in the application of force by the cylinders. The cylinders 50 are initially pressurized to a low start pressure of about 8.8 psi to retract the cylinders and bring the chains linkages 60 taut. The test sequence is then carried out according to the desired parameters to determine the capacity of the test specimen and/or its failure point. The microprocessor preferably performs calculations to convert the pressure applied at the cylinders to an equivalent load per unit area of the test specimen, for example converting psi delivered to the cylinders to lb/ft$^2$ applied to the test specimen 12. The test data and results are preferably recorded electronically, for example formatted in a manner usable with standard data management software such as Microsoft Excel. The invention further comprises the methods of testing using the apparatus as described herein, as well as computer readable software recorded on any suitable computer-readable media for carrying out said methods.

For example, testing can be implemented to determine compliance with ANSI/SPRI ES-1 or BSR/SPRI/FM4435 ES-1 Guidelines and Wind Design Standard for Edge Systems Used with Low Slope Roofing Systems (the "edge systems test Procedure"), SPRI GD-1 (the "gutter systems test procedure") or with any of a variety of other test guidelines. In an example test sequence, the cylinders 50 are actuated to apply loads incrementally and hold each incremental load for not less than 60 seconds after stabilization is achieved at each incremental load. Between incremental loads, the loading is reduced to zero until the specimen stabilizes, or for five minutes, whichever happens first. After a recovery period of not more than five minutes at zero load, the next higher incremental load is initiated. More particularly, loading is applied uniformly on centers no greater than 12 in. (300 mm) apart along the centerline of the vertical and horizontal faces of the edge flashing test specimen. Loads shall be applied incrementally and held for not less than 60 seconds after stabilization has been achieved at each incremental load. Between incremental loads, the loading shall be reduced to zero until the test specimen stabilizes, or for five minutes, whichever happens first. After a recovery period of not more than five minutes at zero load, the next higher incremental load is initiated. Loading to the face of the edge flashing test specimen shall be applied in increments of 15 psf (0.7 kPa). Loading speed shall be such that each incremental load up to and including 150 psf (7.2 kPa) shall be achieved in 60 seconds or less. Above 150 psf (7.2 kPa), incremental loading shall be achieved in 120 seconds or less. Loading shall proceed as indicated until the test specimen either fails or exceeds the required design pressure. The increments of load shall be a maximum of 15 psf (0.7kPa) chosen so that a sufficient number of observations are made to determine the exact load at failure. The last sustained 60-second load without failure is the maximum load recorded as the design value.

Upon failure of the building component test specimen 12 (see FIGS. 9 and 10), one or more safety shut-off mechanisms are preferably triggered to discharge pressure from the cylinders 50 in a controlled manner to prevent equipment damage or personnel injury. For example, sensors can be provided to detect a failure of the test specimen 12, with the sensors operably connected to the control system to discharge pressure upon any sudden change in applied force or cylinder extension, and/or laser proximity sensors and/or subsonic sensors can trigger pressure release in response to any significant movement of the test specimen or other equipment components of the apparatus. In the embodiment depicted in FIG. 15, four ultrasonic sensors 78 are mounted to the frame 20, two at opposite ends of each array of cylinders 50, all arranged to detect any significant movement of the test specimen (which indicates that the test specimen has failed and pulled away from the test base 14), and all operably connected to the control system to cause the release of pressure from the cylinders 50 upon detecting significant movement of the test specimen. For example, the ultrasonic sensors 78 can be set to be triggered if the test specimen 12 moves more than three inches. A suitable ultrasonic sensor 78 is PEPPERL+FUCHS, Inc. (Twinsburg, Ohio), Model No. UC2000-30GM-IUR2-V15.

Even with the provision of the safety shut-off mechanism, the cylinders 50 and linkages 60 are still subject to sudden and forceful movements upon failure of the test specimen 12. The cylinders 50 and linkages 60 can jerk suddenly and wildly, possibly damaging the apparatus 10 or injuring the operator or bystanders.

As further safety features, the apparatus 10 preferably includes motion restrictors that limit the range of movement of the cylinders 50 and absorb any impact by the cylinders upon failure of the test specimen 12. In the depicted embodiment, an elongated resilient foam block 80 is mounted (e.g., attached or wedged in) adjacent to and in front of the swivel joints 56a connecting the vertical-force cylinders 50a to the frame 20 to prevent the vertical-force cylinders from swinging too far outwardly and striking someone or something (see FIGS. 1 and 7). In addition, a series of rubber dampeners 82 are mounted adjacent and below the pivotal joints 56b connecting the horizontal-force cylinders 50b to the frame 20 to prevent the horizontal-force cylinders from swinging too far down and striking the floor (see FIGS. 4 and 7). In alternative embodiments, the motion restrictors for the vertical-force cylinders 50a are provided by rubber dampeners, the motion restrictors for the horizontal-force cylinders 50b are provided by an elongated resilient foam block, and the motion restrictors for all the cylinders are provided by other conventional dampening devices.

For calibrating and double-checking the simulated wind-loading provided by the cylinders 50 of the force-application system, a load-testing device 84 may be installed between the test specimen 12 and one of the cylinders 50. In the embodiment depicted in FIG. 16, for example, the load-testing device 84 is coupled to one of the linkages 60 and one of the eye bolts 62. A suitable load-testing device 84 is available from INTERCOMP, model no. CS200.

Figure 17:
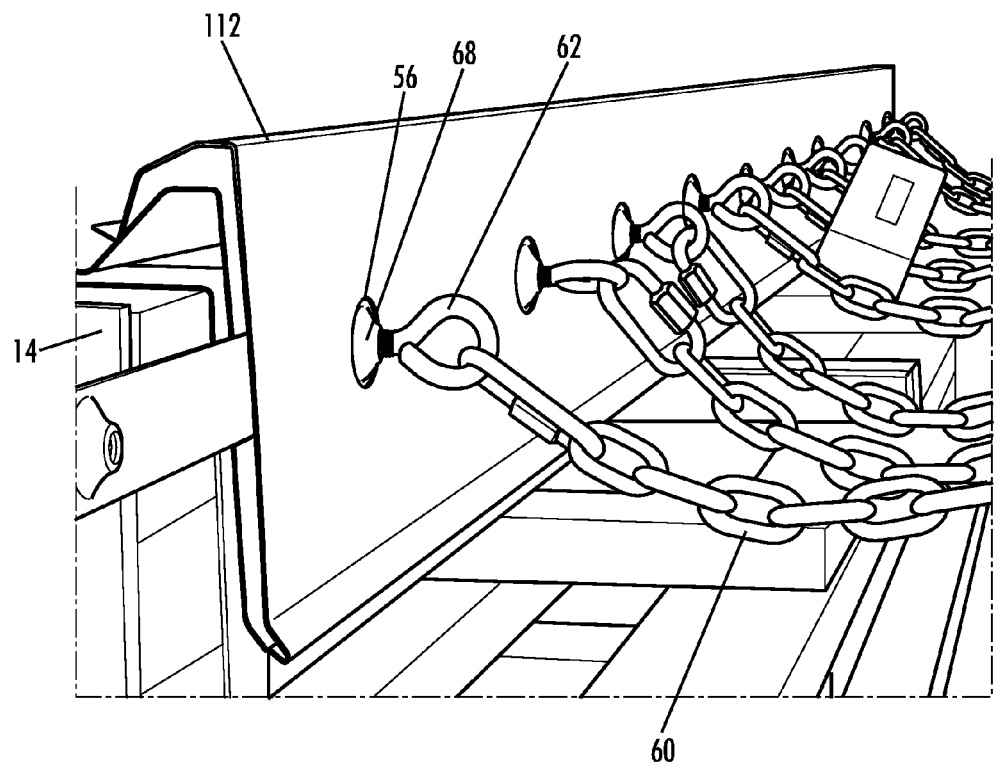
FIG. 17 shows a fascia type of edge component as the test specimen being tested on the testing apparatus of FIG. 1.

In FIGS. 1-16 the test specimen 12 being tested by the apparatus 10 is a length of coping. As mentioned above, the apparatus 10 can be used to test a variety of different types and sizes of test specimens. In FIG. 17, for example, the test specimen 112 being tested by the apparatus 10 is a length of fascia. When testing a fascia test specimen 112, the horizontal-force cylinders 50b and linkages 60 are connected to the test specimen, but not the vertical-force cylinders 50a. The control system is operable to cause the horizontal-force cylinders 50b to apply lateral forces to the test specimen 112 according to the same edge systems test procedure described above.

Figure 18:
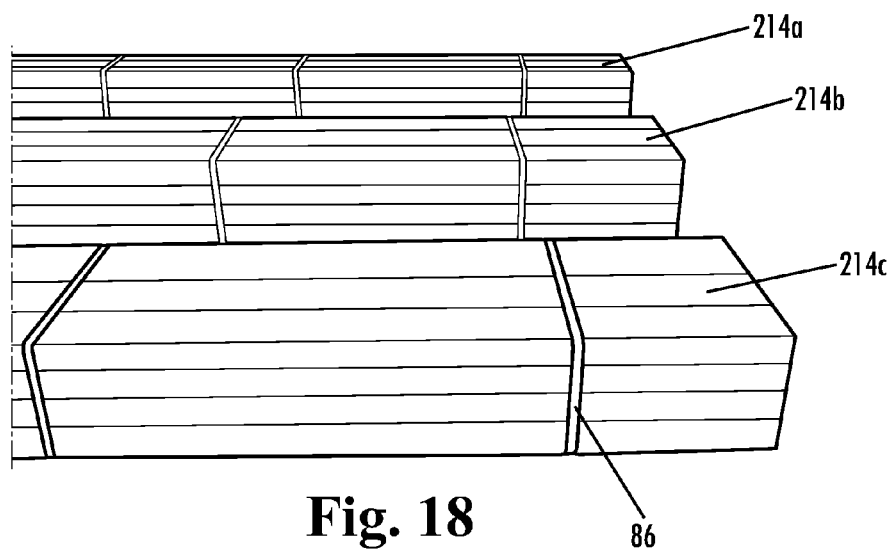
FIG. 18 shows a front perspective view of a portion of a testing apparatus according to a second example form of the present invention that has a modified test base.
Figure 19:
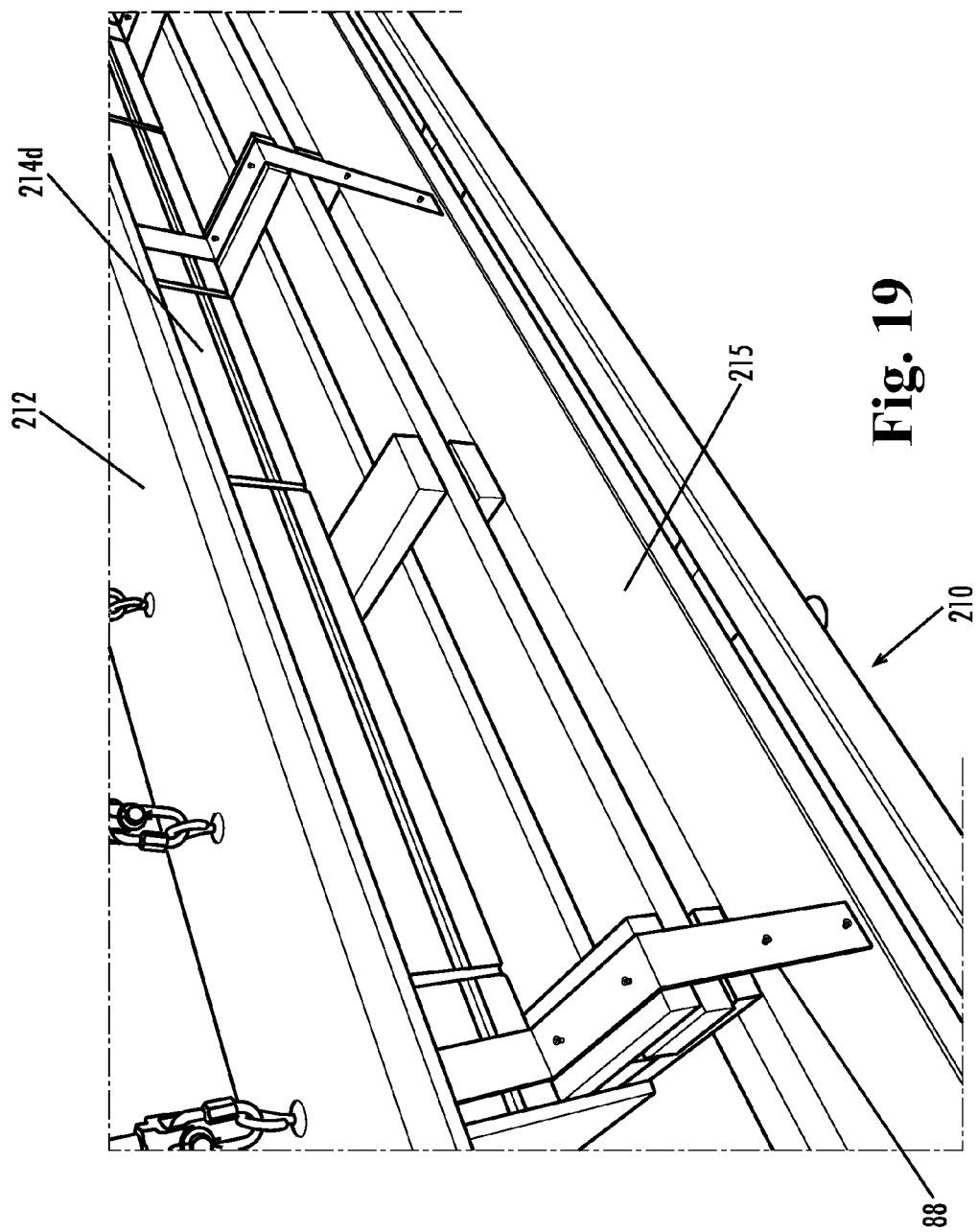
FIG. 19 shows several additional test bases that can interchanged onto the testing apparatus of FIG. 18. for testing different types and sizes of test specimens.

In the first example embodiment shown in FIGS. 1-17, the test base 14 has two spaced apart members whose spacing is selected for the type and size of the particular test specimen to be tested. In a second example embodiment of the present invention, multiple dedicated test bases are provided, with each of the test bases sized for a particular size of test specimen. For example, FIGS. 18 and 19 show four test bases 214a, 214b, 214c, and 214d (collectively, the "test bases 214"), with test base 214a simulating a 7¾ wall structure, test base 214b simulating a 11¾ wall structure, test base 214c simulating a 12½ wall structure, and test base 214d simulating a 10½" wall structure. The test specimen 212 being used on the testing apparatus 210 of FIG. 18 is a length of 10½" wide coping mounted on test base 24d. In alternative embodiments, other test bases 214 can be included for simulating or other sized walls. The depicted test bases 214 are made of a number of 2"×4" pieces of wood that are strapped together by bands 86, and the test bases 214 are removably secured to the pedestal 215 by bands 88. The bands 86 and 88 may be provided by conventional steel strapping.

Figure 20:
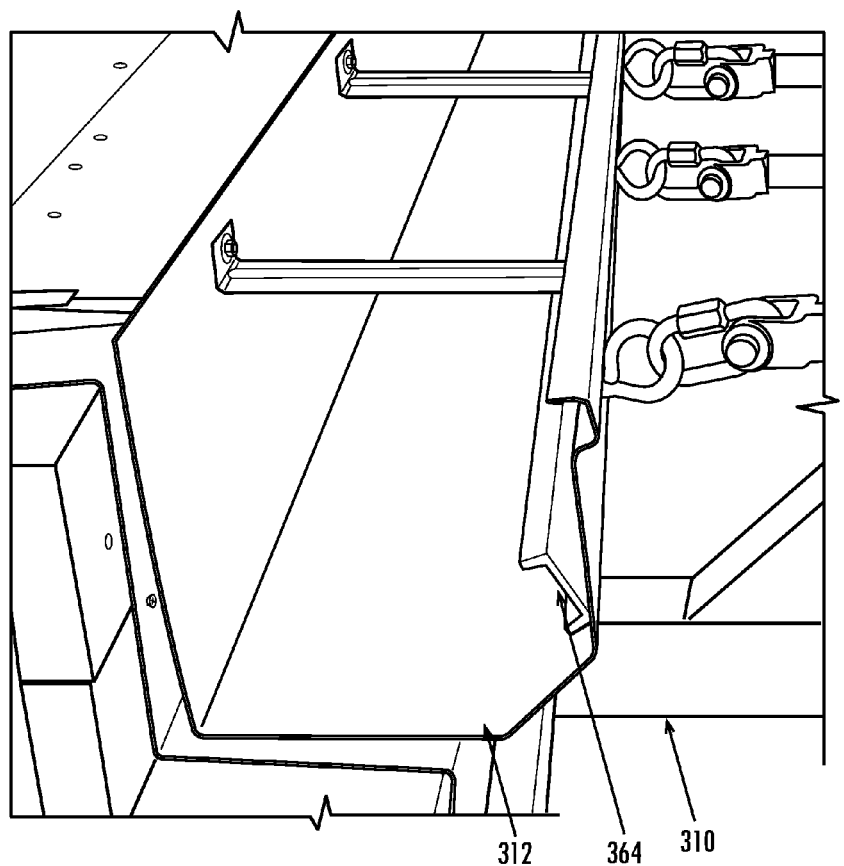
FIG. 20 shows a front perspective view of a portion of a testing apparatus according to a third example form of the present invention that is modified for testing gutter systems.

In a third example embodiment shown in FIG. 20, the apparatus 310 is modified for also testing lengths of gutter 312. In this embodiment, the control system of the apparatus 310 includes programming for applying a test procedure for determining the wind resistance of gutter test specimens, for example, the test procedure specified in SPRI GD-1 Design Standard for Gutter Systems Used with Low Slope Roofs (the "gutter systems test procedure"), in addition to applying the "edge systems test procedure." While the "gutter systems test procedure" and the "edge systems test procedure" are the test procedures typically used, it will be understood that the duration and magnitude of the "pull" and the duration of the "relax" (no-pull) period may be user-inputted to other values, as may be desired for customized or other non-standard tests.

Basically, the gutter systems test procedure includes a 60-second pull at 25-pound increments up to 150 pounds, then 10-pound increases every 60 seconds until failure. (This compares with the edge systems test procedure, which basically includes a 60-second pull at incrementally greater 15-pound pulls with a period of relax there between until failure.) First, the test is run applying only the horizontal or vertical forces using only the horizontal-force cylinders or only the vertical-force cylinders, so only the horizontal-force pull bar or vertical-force pull bar is used. (As mentioned above, the control system is programmed so that the horizontal-force cylinders and the vertical-force cylinders are independently operable.) In the depicted figure, for example, the testing machine 310 is set up with the gutter test specimen 312 mounted to the vertical rear face of the test base and the horizontal-force cylinders attached to the horizontal-force pull bar 364 to apply only horizontal forces.

After completion of the test sequence applying only the horizontal or vertical forces, the test specimen 312 is removed from the test base and reattached for testing the other of the horizontal or vertical forces. For example, the depicted gutter test specimen 312 can be removed from the test base, rotated 90 degrees counter-clockwise, and re-attached with its vertical eave-side face mounted to the horizontal top face of the test base, so that the horizontal-force cylinders can be attached to the horizontal-force pull bar 364 to apply vertical forces to the bottom side of the gutter. Alternatively, the depicted gutter test specimen 312 can be removed from the test base, inverted, and re-attached in an inverted orientation to the vertical rear face of the test base, so that the vertical-force cylinders can be attached to the vertical-force pull bar to apply vertical forces. Then the same test sequence is run applying only the other force. Thus, the gutter test pulls both horizontally and vertically, but not simultaneously. In addition, a different pull bar may be used when testing the gutter test specimens 312. In the depicted embodiment, for example, the horizontal pull bar 364 is provided by a ½"×1"×½"×⅛" thick U-shaped member.

Preferably, the touch-screen of the control panel displays a "startup" screen with a menu for the user to select the edge systems test procedure, the gutter systems test procedure, or a non-standard test procedure, and upon entering a selection the control system then carries out the selected test procedure. Alternatively, the control system may include switches or other structures for selecting the test procedure to be run.

Figure 21:
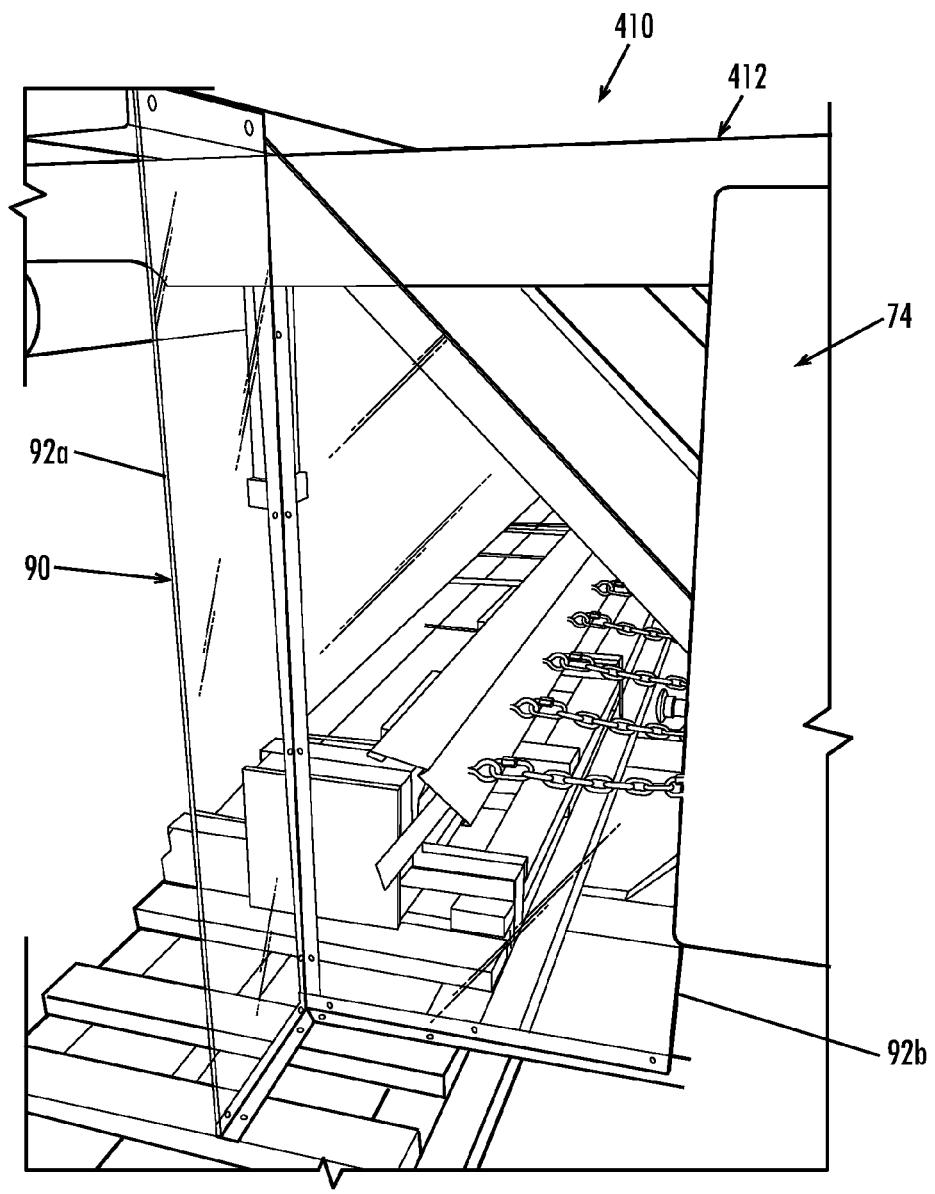
FIG. 21 shows a rear perspective view of a portion of a testing apparatus according to a fourth example form of the present invention that includes a transparent shield for protecting the machine operator.

In a fourth example embodiment shown in FIG. 21, as an added safety measure the testing apparatus 410 includes a protective transparent shield 90 mounted to the frame 412 adjacent the control panel 74. The shield 90 protects the machine operator, who is at the control panel 74. For example, the shield 90 can be provided by two panels 92a and 92b of ¼" thick clear plastic material such as a LEXAN mounted to the frame 412 using conventional hardware.

While the invention has been described with reference to preferred and example embodiments, it will be understood by those skilled in the art that a variety of modifications, additions and deletions are within the scope of the invention, as defined by the following claims.

What is claimed is:

1. A testing apparatus for determining wind resistance of a building component, the testing apparatus comprising:
   a structural frame;
   a test base mounted to the frame and adapted to mount the building component thereto;
   at least one pull bar positionable between the test base and the building component; and
   at least one array of actuators mounted to the frame and adapted to couple to the at least one pull bar to apply force thereto
   wherein the at least one array of actuators comprises a first array of actuators arranged for applying a vertical force and a second array of actuators arranged for applying a horizontal force, and the at least one pull bar comprises a first pull bar that couples to the first array of actuators for applying the vertical force to the building component and a second pull bar that couples to the second array of actuators for applying the horizontal force to the building component, and
   wherein the vertical-force actuators are mounted to the frame by swivel joints permitting the vertical-force actuators to swivel in any direction.

2. The testing apparatus of claim 1, wherein the at least one array of actuators comprises pneumatic cylinders.

3. The testing apparatus of claim 1, further comprising a control system operably connected to the actuators and adapted to activate and deactivate the actuators to apply the force to the pull bar according to a test procedure programmed into the control system.

4. The testing apparatus of claim 3, further comprising at least one sensor adapted to detect a failure of the building component, the sensor operably connected to the control system, the control system adapted to deactivate the actuators upon the detection of the failure by the sensor.

5. A testing apparatus for determining wind resistance of a building component, the testing apparatus comprising:
   a structural frame;
   a test base mounted to the frame and adapted to mount the building component thereto;
   at least one pull bar positionable between the test base and the building component; and
   at least one array of actuators mounted to the frame and adapted to couple to the at least one pull bar to apply force thereto,
   wherein the at least one array of actuators comprises a first array of actuators arranged for applying a vertical force and a second array of actuators arranged for applying a horizontal force, and the at least one pull bar comprises a first pull bar that couples to the first array of actuators for applying the vertical force to the building component and a second pull bar that couples to the second array of actuators for applying the horizontal force to the building component, and
   wherein the horizontal-force actuators are mounted to the frame by pivotal joints permitting the horizontal-force actuators to pivot about one axis only, and further comprising an array of linkages connecting the horizontal-force actuators to the second pull bar, wherein the linkages are elongated so that the horizontal-force actuators and the second pull bar do not need to be in alignment.

6. A testing apparatus for determining wind resistance of a building component, the testing apparatus comprising:
   a structural frame;
   a test base mounted to the frame and adapted to mount the building component thereto;
   at least one pull bar positionable between the test base and the building component; and
   at least one array of actuators mounted to the frame and adapted to couple to the at least one pull bar to apply force thereto,
   wherein the at least one array of actuators comprises a first array of actuators arranged for applying a vertical force and a second array of actuators arranged for applying a horizontal force, and the at least one pull bar comprises a first pull bar that couples to the first array of actuators for applying the vertical force to the building component and a second pull bar that couples to the second array of actuators for applying the horizontal force to the building component, and
   wherein the vertical-force actuators and the horizontal-force actuators are mounted to the structural frame by joints permitting angular movement of the actuators, and further comprising one or more motion restrictors mounted to the frame and adapted to limit forward swinging movement of vertical-force actuators and one or more motion restrictors mounted to the frame and adapted to limit downward swinging movement of horizontal-force actuators.

7. A testing apparatus for determining wind resistance of a building component, the testing apparatus comprising:
   a structural frame;
   a test base mounted to the frame and adapted to mount the building component thereto;
   at least one pull bar positionable between the test base and the building component;
   at least one array of actuators mounted to the frame and adapted to couple to the at least one pull bar to apply force thereto; and
   at least one array of linkages connected to the actuators and at least one array of couplings adapted to connect the linkages to the pull bar with the building component positioned between the linkages and the pull bar.

8. The testing apparatus of claim 7, wherein the at least one array of actuators comprises a first array of actuators arranged for applying a vertical force and a second array of actuators arranged for applying a horizontal force, and the at least one pull bar comprises a first pull bar that couples to the first array of actuators for applying the vertical force to the building component and a second pull bar that couples to the second array of actuators for applying the horizontal force to the building component.

9. The testing apparatus of claim 8, wherein the vertical-force actuators are mounted to the frame by swivel joints permitting the vertical-force actuators to swivel in any direction.

10. The testing apparatus of claim 7, wherein the building component includes at least one array of holes formed therein and the couplings extend through the holes.

11. The testing apparatus of claim 10, wherein the couplings include nuts attached to the pull bars and eye-bolts that extend through the holes in the building component and matingly couple with the nuts.

12. A method of testing wind resistance of a building component, the method comprising:
   providing a testing apparatus for determining wind resistance of the building component, the testing apparatus comprising:

a structural frame;

a test base mounted to the frame and adapted to mount the building component thereto;

at least one pull bar positional between the test base and the building component; and at least one array of actuators mounted to the frame and adapted to couple to the at least one pull bar to apply force thereto;

forming an array of holes in the building component;

inserting a plurality of couplings into the holes so that the couplings extend through the building component;

connecting the pull bars to the couplings with the building component between the pull bars and the couplings;

confirming that the test base is suitable for use with the building component, and if not then adjusting or replacing the test base with a suitable one;

mounting the building component to the test base;

connecting the couplings to the actuators;

selecting the desired test procedure using the control system; and initiating the test procedure using the control system, wherein the control system operates the actuators to apply the force to the pull bar according to the test procedure.

13. The method of claim 12, wherein the test procedure includes applying the force in sequentially increasing increments according to ANSI/SPRI ES-1 or BSR/SPRI/FM4435 ES-1 testing standard for edge component systems or ANSI/SPRI GD-1 testing standard for gutter systems.

14. The building component tested using the method of claim 12.

15. The building component of claim 14, wherein the building component is an edge component or a gutter component.

16. A testing apparatus for determining wind resistance of a building roof component having first and second arrays of holes formed therein, the testing apparatus comprising:

a structural frame;

a test base mounted to the frame and adapted to mount the building component thereto;

first and second pull bars positionable between the test base and the building component;

first and second arrays of actuators mounted to the frame, the first array of actuators arranged for applying a vertical force and the second array of actuators arranged for applying a horizontal force;

first and second arrays of linkages, the first linkages connected to the first actuators and the second linkages connected to the second actuators;

first and second arrays of couplings, the first couplings extending through the first holes and connecting the first linkages to the first pull bar with the building component between the first linkages and the first pull bar, and the second couplings extending through the second holes and connecting the second linkages to the second pull bar with the building component between the second linkages and the second pull bar, wherein the first actuators are operable to apply the vertical force to the first pull bar and the second actuators are operable to apply the horizontal force to the second pull bar, and the first and second pull bars transfer the forces to the building component.

17. The testing apparatus of claim 16, wherein the vertical-force actuators are mounted to the frame by swivel joints permitting the vertical-force actuators to swivel in any direction, the horizontal-force actuators are mounted to the frame by pivotal joints permitting the horizontal-force actuators to pivot about a horizontal axis only, and the second linkages are elongated so that the horizontal-force actuators and the second pull bar do not need to be in horizontal alignment.

18. The testing apparatus of claim 16, wherein the vertical-force actuators and the horizontal-force actuators are mounted to the structural frame by joints permitting angular movement of the actuators, and further comprising one or more motion restrictors mounted to the frame and adapted to limit forward swinging movement of vertical-force actuators and one or more motion restrictors mounted to the frame and adapted to limit downward swinging movement of horizontal-force actuators.

19. The testing apparatus of claim 16, wherein the couplings include nuts attached to the pull bars and eye-bolts that extend through the holes in the building component and matingly couple with the nuts, wherein at least one part of the eyebolts is configured so that the eyebolts can not pass entirely through the holes.

20. The testing apparatus of claim 16, further comprising a control system operably connected to the actuators and adapted to activate and deactivate the actuators to apply the vertical and horizontal forces to the building component according to a test procedure programmed into the control system, and at least one sensor adapted to detect a failure of the building component, the sensor operably connected to the control system, the control system adapted to deactivate the actuators and initiate discharging of pressure from the actuators upon the detection of the failure by the sensor.

21. The testing apparatus of claim 16, further comprising a load-testing device interposed between one of the linkages and the corresponding coupling, the load-testing device adapted to calibrate and confirm the forces applied by the actuators.

22. The testing apparatus of claim 16, further comprising a control panel that houses controls for operating the machine and a transparent shield adjacent the control panel for protecting an operator of the machine.

* * * * *